(12) United States Patent
Hsiao et al.

(10) Patent No.: US 10,620,171 B2
(45) Date of Patent: Apr. 14, 2020

(54) METHODS OF LIQUID CHROMATOGRAPHY FOR ANIONIC COMPOUNDS

(71) Applicant: Agilent Technologies, Inc., Santa Clara, CA (US)

(72) Inventors: Jordy J. Hsiao, Santa Clara, CA (US); Hongfeng Yin, Cupertino, CA (US); Oscar G. Potter, Santa Clara, CA (US)

(73) Assignee: AGILENT TECHNOLOGIES, INC., Santa Clara, CA (US)

( * ) Notice: Subject to any disclaimer, the term of this patent is extended or adjusted under 35 U.S.C. 154(b) by 201 days.

(21) Appl. No.: 15/692,750

(22) Filed: Aug. 31, 2017

(65) Prior Publication Data

US 2019/0064126 A1 Feb. 28, 2019

(51) Int. Cl.
| | |
|---|---|
| *G01N 30/00* | (2006.01) |
| *G01N 30/72* | (2006.01) |
| *G01N 30/16* | (2006.01) |
| *G01N 30/88* | (2006.01) |
| *G01N 30/06* | (2006.01) |
| *B01D 15/30* | (2006.01) |

(Continued)

(52) U.S. Cl.
CPC ....... *G01N 30/7233* (2013.01); *B01D 15/305* (2013.01); *B01D 15/325* (2013.01); *B01D 15/34* (2013.01); *B01D 15/424* (2013.01); *G01N 30/06* (2013.01); *G01N 30/16* (2013.01); *G01N 30/34* (2013.01); *G01N 30/88* (2013.01); *G01N 2030/027* (2013.01); *G01N 2030/065* (2013.01); *G01N 2030/884* (2013.01); *G01N 2030/8831* (2013.01)

(58) Field of Classification Search
CPC .................................................. G01N 30/7233
USPC ........................................................... 436/161
See application file for complete search history.

(56) References Cited

U.S. PATENT DOCUMENTS

| | | |
|---|---|---|
| 6,017,457 A | 1/2000 | Gjerde et al. |
| 6,030,527 A | 2/2000 | Gjerde et al. |

(Continued)

FOREIGN PATENT DOCUMENTS

| | | |
|---|---|---|
| WO | 9533757 A1 | 12/1995 |
| WO | 2006127973 A2 | 11/2006 |

OTHER PUBLICATIONS

Y. Ohta et al. "Salt Tolerance Enhancement of Liquid Chromatography—Matrix-Assisted Laser Desorption/Ionization-Mass Spectrometry Using Matrix Additive Methylenediphosphonic Acid" Mass Spectrum (Tokyo) 2014; 3(1): A0031; DOI: 10.5702/massspectrometry.A0031 (Year: 2014).*

(Continued)

*Primary Examiner* — Christopher Adam Hixson
*Assistant Examiner* — Emily R. Berkeley
(74) *Attorney, Agent, or Firm* — Gianna J. Arnold; Saul Ewing Arnstein & Lehr LLP

(57) ABSTRACT

The present disclosure generally relates to improved methods for separating and analyzing compounds by liquid chromatography, particularly when coupled with mass spectrometry. The methods include the addition of an additive to a mobile phase carrying a sample. The mobile phase additive may be effective for improving peak shapes of targeted analytes in acquired data, and/or eliminating or at least reducing ion suppression. The methods are particularly suited for anionic compounds such as phosphorylated compounds.

20 Claims, 24 Drawing Sheets

Specification includes a Sequence Listing.

Sample & Mobile Phase (Solvents)
Additive Medronic acid

Liquid Chromatography column packed
with Stationary Phase

Separated
analytes

Mass
spectrometry

(51) Int. Cl.
  *B01D 15/32* (2006.01)
  *B01D 15/34* (2006.01)
  *B01D 15/42* (2006.01)
  *G01N 30/34* (2006.01)
  *G01N 30/02* (2006.01)

(56) References Cited

U.S. PATENT DOCUMENTS 6,174,441 B1 1/2001 Gjerde et al.
6,579,459 B2 6/2003 Gjerde et al.

OTHER PUBLICATIONS

Apffel, Alex et al.; "Analysis of Oligonucleotides by HPLC-Electrospray Ionization Mass Spectrometry" Anal. Chem. 1997, 69, 1320-1325.

Cordell, Rebecca L. et al.; "Quantitative profiling of nucleotides and related phosphate-containing metabolites in cultured mammalian cells by liquid chromatography tandem electrospray mass spectrometry" Journal of Chromatography B, 871 (2008) 115-124.

Hindle, Ralph, "Improved Analysis of Trace Hormones in Drinking Water by LC/MS/MS (EPA 539) using the Agilent 6460 Triple Quadrupole LC/MS" Agilent Technologies, Inc. May 28, 2013.

Myint, "Supplementary Table S1 Standard compounds and limits of detection (LOD)" Anal Chem, 2009, vol. 81, pp. 7766-7772.

Myint, Khin Than et al.; "Polar Anionic Metabolome Analysis by Nano-LC/MS with a Metal Chelating Agent" Anal. Chem. 2009, 81, 7766-7772.

Pesek, Joseph J. et al.; "Improvement of peak shape in aqueous normal phase analysis of anionic metabolites" J. Sep. Sci. 2011, 34, 3509-3516.

Pesek, Joseph J. et al.; "Silica Hydride-Chemistry and Applications" Advances in Chromotography: vol. 48, 2010, pp. 255-288.

Tölgyesi, László et al.; "Determination of Endocrine-Disrupting Chemicals in Drinking Water at Sub ng/L Levels Using the Agilent 6495 Triple Quadrupole Mass Spectrometer" Agilent Technologies, Inc., Jun. 24, 2014.

Extended European Search Report issued in counterpart EP Application No. 18158000.2 dated Jul. 30, 2018 (seven (7) pages).

Hsiao, Jordy J., et al. "Improved LC/MS Methods for the Analysis of Anionic Analytes." Analytical Chemistry. Jun. 3, 2009 (four (4) pages).

\* cited by examiner

Sample & Mobile Phase (Solvents)
Additive Medronic acid

Liquid Chromatography column packed
with Stationary Phase

Separated
analytes

Mass
spectrometry

METHODS OF LIQUID CHROMATOGRAPHY FOR ANIONIC COMPOUNDS

TECHNICAL FIELD

The present disclosure generally relates to improved methods of liquid chromatography. Specifically, the disclosure relates to improved methods for separating and analyzing compounds using liquid chromatography-mass spectrometry (LC-MS) systems in general. The methods are particularly suited for anionic compounds such as phosphorylated compounds.

BACKGROUND

In a liquid chromatography (LC) system, a mobile phase consisting of one or more solvents is driven under high system pressure through a separation unit, which often is provided in the form of a chromatography column. In high-performance LC (HPLC) systems and ultra high-performance LC (UHPLC) systems, the system pressure may be as high as, for example, about 1200 bar. The column contains a stationary phase, which in LC is typically provided in the form of a packed bed of particles such as, for example, silica beads. The particles are formulated and/or functionalized so as to separate different analytes or components (e.g., chemical compounds) in a sample. As the sample flows through the column, the sample contacts the stationary phase. The different components of the sample have different affinities for the stationary phase. This causes the different components to separate from each other as the liquid flows through the column. Consequently, the different components elute from the column outlet at different times. Hence, the output of liquid from the column contains a series of bands, each band consisting of a distinct component of the sample. That is, the bands respectively consist of the different components of the sample that were separated from each other by the column.

From the column outlet, the mobile phase and the series of bands carried therein flow to a detector configured to detect each individual band. As one example, the detector may include a flow cell through which the liquid flows, a light source, and a light detector configured to make optical-based measurements (e.g., absorbance) on the liquid flowing through the flow cell. Electrical signals produced by the detector may then be utilized to produce a chromatogram. Typically, the chromatogram plots signal intensity as a function of retention time, or alternatively as a function of retention volume. The data plot appears as a series of peaks corresponding to the series of respective bands detected by the detector. In analytical chromatography, the chromatogram is utilized to identify components in the sample and indicate their relative concentrations in the sample. Alternatively, in preparative chromatography the separating power of the column may be utilized to purify the sample, for example to isolate a target compound from other compounds contained in the sample.

An LC system may be coupled to a mass spectrometry (MS) system, thereby forming a hybrid LC-MS system. A mass spectrometry (MS) system in general includes an ion source for ionizing components of a sample under investigation, a mass analyzer for separating the gas-phase ions based on their differing mass-to-charge ratios (or m/z ratios, or more simply "masses"), an ion detector for counting the separated ions, and electronics for processing output signals from the ion detector as needed to produce a user-interpretable mass spectrum. Typically, the mass spectrum is a series of peaks indicative of the relative abundances of detected ions (e.g., ion signal intensity such as number of ion counts for each ion detected) as a function of their m/z ratios. In a hybrid LC-MS system, the separated compounds eluting from the LC column are introduced into the ion source of the MS system. The compounds are ionized in the ion source, and the resulting ions are transferred into the mass analyzer and detected on a mass-discriminated basis. A hybrid LC-MS system is thus capable of acquiring three-dimensional (3D) LC-MS data from a sample, characterized by elution time (or acquisition time or retention time), ion abundance, and m/z ratio as sorted by the MS.

Historically LC was performed with an organic solvent and a polar stationary phase, such as silica or alumina. With this "normal phase chromatography" more polar analytes bind to the polar stationary phase. Those analytes are retained by the column and elute later. Non-polar analytes bind less strongly and elute earlier from the column. Beginning in the 1980's reversed-phase chromatography (RPC) became widely used. In RPC an aqueous or polar solvent is used and the silica is functionalized with hydrophobic groups, e.g., octadecyl chains (C-18). In RPC the order of elution is the opposite or reversed. A non-polar analyte will be retained longer by the non-polar stationary phase and elute later. Conversely, the more polar analytes do not bind to the functionalized silica and elute earlier in the polar mobile phase.

In the life sciences one problem with RPC is that important polar or ionic biomolecules interact minimally with the hydrophobic column if at all and tend to elute near the column void volume. Pesek, J J, Matyska, M T, in: Wang, P G, He, H (Eds.), Hydrophilic Interaction Chromatography (HILIC) and Advanced Applications, CRC Press, Boca Raton, Fla. 2011, pp. 1-26 at 2. To overcome this issue ion-pairing techniques or hydrophilic interaction chromatography (HILIC) systems have been developed. Ion-pairing techniques coupled to RPC have been moderately successful using agents such as tetrabutylammonium hydroxide or N,N dimethylhexylamine (DMHA). Moreover, ion-pairing reagents are known to contaminate LC systems and columns that could never be washed fully away, which forces users to dedicate an LC system and column for one specific application. See Cordell et al. 2008 J Chrom B 871 115-124. On the other hand, HILIC uses a polar solvent and stationary phase that is also polar. The solvent will often contain large quantities of an organic solvent such as acetonitrile that leads to more interaction of the polar, hydrophilic analytes with the stationary phase. However, a robust HILIC column and method have not been developed to be widely accepted by the scientific community, partially due to reasons described in the next section.

Poor peak shapes are commonly observed in LC/MS experiments for highly negatively charged biomolecules such as nucleotides, or organic acids with more than one carboxylate group. See Pesek et al. 2011 J Sep Sci 34 1-8. This problem is important because good peak shape provides (1) good resolution between different analytes and (2) accurate quantitation. Using a nano-LC/MS system it was demonstrated that the poor peak shape is caused by the presence of trace metals, particularly iron, that are often found in very low concentrations from a variety of sources within the chromatographic system. See Myint et al. 2009 Anal Chem 81 7766-7772. Myint et al. used a polyamine-bonded polymer-based apHera™ NH2 column to separate organic acids and phosphorylated metabolites. They found peak shape significantly improved after flushing the column with the chelating agent, ethylenedimethyltetraamine (EDTA). However, after multiple uses of the column, the EDTA was flushed out of the system and the peak shape deteriorated. They hypothesize that the deterioration was due to metallic impurities in the organic solvent or ammonium salts. Myint et al. overcame this issue by coinjection of EDTA into the mobile phase. Myint et al. at 7769.

Other workers using a silica hydride stationary phase studied the addition of EDTA to the mobile phase to chelate metals in the system as a means to improve the chromatography. Pesek J J et al., 2011 J Sep Sci 34 3509-3516. They studied (i) flushing the system with EDTA, (ii) adding EDTA to the mobile phase, or (iii) preparing the sample with EDTA. The addition of EDTA resulted in improved peak shapes of the targeted analytes.

However, EDTA can be retained on HILIC columns and cause ion suppression for targeted compounds (see FIGS. 1A-1B and FIGS. 2A-2B herein, and Pesek J J et al., 2011). Moreover, the mass spectrometer instrument could not be used in positive ion mode with EDTA in the mobile phase due to its high ionization efficiency in positive ion mode analysis, thus rendering this approach limited to use in the negative ion mode analysis with the mass spectrometer.

SUMMARY

To address the foregoing needs, in whole or in part, and/or other needs that may have been observed by persons skilled in the art, the present disclosure provides methods, processes, systems, apparatus, instruments, and/or devices, as described by way of example in implementations set forth below.

According to one embodiment, the disclosure provides a method for analyzing one or more analytes in a sample by liquid chromatography coupled to mass spectrometry, comprising: providing a liquid chromatography column packed with a stationary phase; providing a mobile phase comprising one or more solvents and an additive of medronic acid; injecting the sample into the mobile phase; performing chromatography under conditions to separate the one or more analytes in the liquid chromatography column, by flowing the mobile phase with the sample through the liquid chromatography column; and analyzing the one or more separated analytes with a mass spectrometer.

In the method above, the liquid chromatography column may be a high-performance liquid chromatography (HPLC) column.

Alternatively, the liquid chromatography column may be an ultra high-performance liquid chromatography (UHPLC) column.

In the method above, the liquid chromatography column may be a hydrophilic interaction liquid chromatography (HILIC) column.

In another embodiment, the liquid chromatography column may be a reverse phase liquid chromatography (RPLC) column.

In one embodiment, the method may be performed using a reverse phase liquid chromatography (RPLC) column operated in an ion pairing mode.

In yet another embodiment, the liquid chromatography column may be a size exclusion column.

According to another embodiment, the disclosure provides a method for analyzing one or more analytes in a sample by liquid chromatography coupled to mass spectrometry, comprising: providing a hydrophilic interaction liquid chromatography (HILIC) column packed with a stationary phase; providing a mobile phase comprising one or more solvents and an additive of pyrophosphoric acid; injecting the sample into the mobile phase; performing chromatography under conditions to separate the one or more analytes in the liquid chromatography column, by flowing the mobile phase with the sample through the liquid chromatography column; and analyzing the one or more separated analytes with a mass spectrometer.

In the methods above, the mass spectrometer may be run in both a positive and a negative mode analysis.

In these methods, the medronic acid or pyrophosphoric acid may be present in a concentration of about 1.0 μM to about 10.0 μM. Alternatively, they may be present from about 0.25 μM to about 25.0 μM; about 0.5 μM to about 15.0 μM; about 0.5 μM to about 2.5 μM; about 2.0 μM to about 5.0 μM; about 5.0 μM to about 10.0 μM.

Preferably, the medronic acid or pyrophosphoric acid is present in a concentration of about 2.5 μM to about 7.5 μM.

In the methods above, the medronic acid or pyrophosphoric acid may be preinjected onto the column as a plug prior to sample analysis.

Alternatively, the medronic acid or pyrophosphoric acid may be coinjected with the sample.

Preferably, the medronic acid or pyrophosphoric acid is added to one or all eluent solvents.

In an alternative embodiment, the medronic acid or pyrophosphoric acid may be introduced through a separate LC channel (e.g., use of a quaternary pump) instead of adding the additive to the mobile phase solvents.

In the methods above, the analytes may be anionic compounds.

The anionic compounds may be phosphorylated compounds, sulfated compounds, or carboxylated compounds.

In one embodiment, the phosphorylated compounds may be phosphopeptides.

In an alternative embodiment, the anionic compounds may be pesticides, pharmaceuticals or their metabolites.

In the methods above, the mobile phase may contain two or more solvents which create a concentration gradient during the chromatography and the concentration of medronic acid or pyrophosphoric acid is kept constant during the chromatography.

Alternatively, the mobile phase may contain two or more solvents which create a concentration gradient during the chromatography and the concentration of medronic acid or pyrophosphoric acid is varied during the chromatography.

In the methods above, the mobile phase may comprise a polar solvent and a non-polar solvent.

In one embodiment, the mobile phase may comprise water and an organic compound. In one embodiment, the organic compound in the mobile phase may be acetonitrile.

In an alternative embodiment, the mobile phase may comprise at least two solvents, and flowing the mobile phase with the sample through the liquid chromatography column is done according to an isocratic elution mode.

In yet another embodiment, the mobile phase may comprise at least two solvents, and flowing the mobile phase with the sample through the liquid chromatography column is done according to a gradient elution mode.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not

DETAILED DESCRIPTION

Figure 1A:
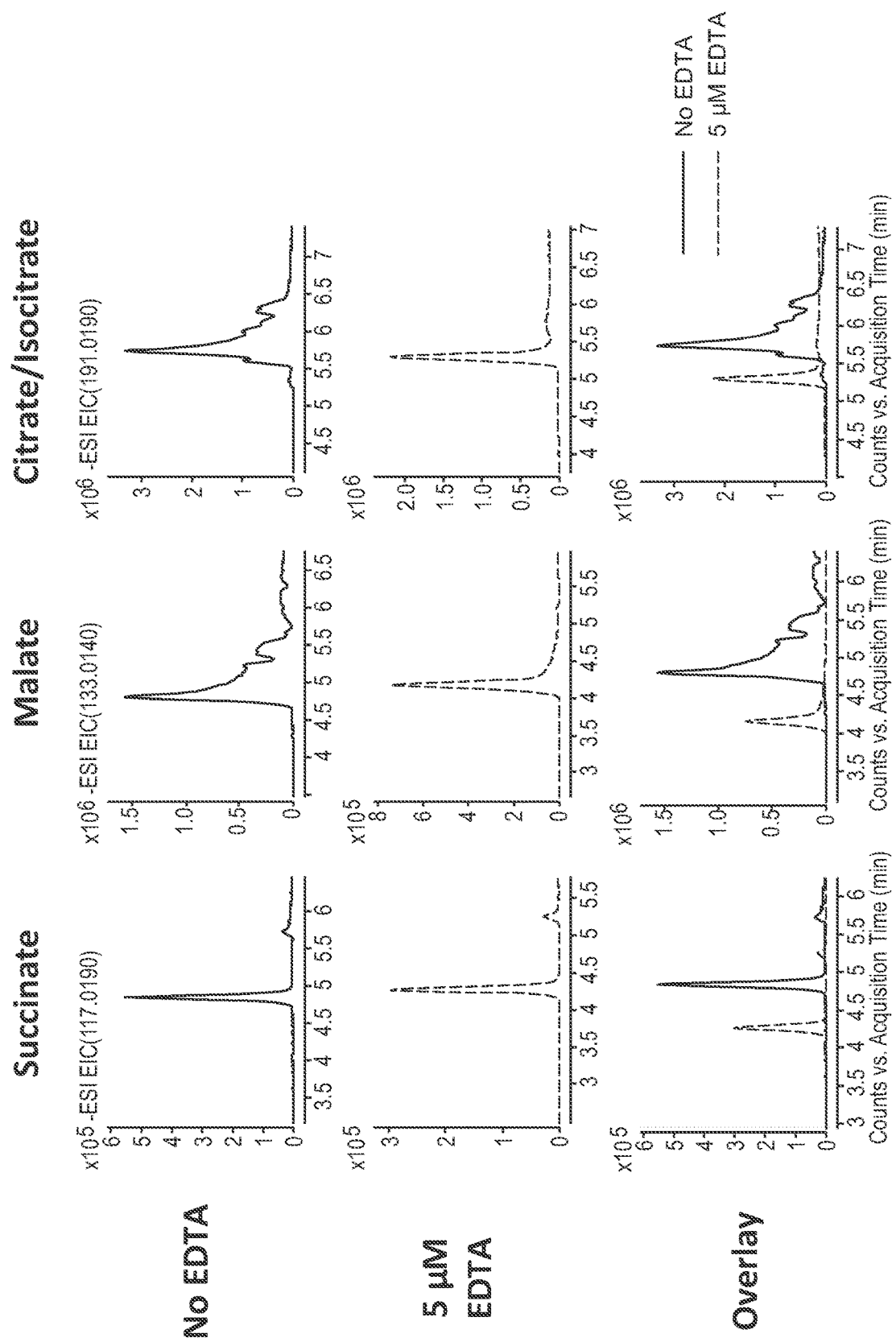
FIG. 1A shows the effect of EDTA addition to the mobile phase on peak shape for organic acids, succinate, malate and citrate/isocitrate.

The IUPAC name for medronic acid is methanediylbis (phosphonic acid). Other names are methanediphosphonic acid; methylenebis(phosphonic acid); methylene diphosphonate; medronate; phosphonomethylphosphonic acid; and MDP. The IUPAC names for pyrophosphoric acid are diphosphoric acid and μ-oxido-bis(dihydroxidooxidophosphorus).

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

Unless defined otherwise, all technical and scientific terms used herein have the same meanings as commonly understood by one of ordinary skill in the art to which this disclosure belongs. Preferred methods, devices, and materials are described, although any methods and materials similar or equivalent to those described herein can be used in the practice or testing of the present disclosure. All references cited herein are incorporated by reference in their entirety.

Liquid chromatography-mass spectrometry (LC-MS) is an important analytical technique to answer an increasing number of significant clinical and biological questions. Charged molecules such as nucleotides and peptides are particularly relevant molecules for these questions and problems. However, the LC-MS separation and analysis of negatively charged molecules such as nucleotides or phosphopeptides has been difficult for several technical reasons. Some techniques such as adding ion-pairing reagents can contaminate LC systems and columns that can't be washed away, which forces users to dedicate an LC system and column for one specific application. Another issue plaguing LC-MS for negatively charged molecules is poor peak shape. The poor peak shape reduces the ability to resolve different analytes and interferes with accurate quantitation. Previously, researchers identified trace metal contamination in the LC-MS system as a cause for poor peak shape for negatively charged molecules. To overcome the trace metal contamination issue, they either flushed the system with EDTA or added EDTA to the mobile phase. Unfortunately, EDTA is retained on some types of columns leading to ion suppression of target compounds. Adding EDTA to the mobile phase also limits the use of the LC-MS system to negative mode ion analysis.

To overcome these issues, the present disclosure provides a method for analyzing analytes in a sample by liquid chromatography coupled to mass spectrometry. The method comprises: providing a liquid chromatography column packed with a stationary phase and providing a mobile phase comprising one or more solvents and an additive of medronic acid. In the method, the sample is injected into the mobile phase and chromatography is performed under conditions to separate the analytes in the liquid chromatography column, by flowing the mobile phase with the sample through the liquid chromatography column. Lastly, the one or more separated analytes are analyzed in a mass spectrometry (MS) system, which generally includes an ion source, a mass analyzer, and an ion detector.

For example, the output from the LC column (i.e., the mobile phase containing the separated analytes) may be introduced into the ion source of the MS system. The ion source ionizes the analytes, and the resulting analyte ions are transferred into the mass analyzer of the MS system, where the analyte ions are sorted according to their differing m/z ratios. The mass-discriminated ions are then detected by the ion detector of the MS system, which measures the abundance of each detected m/z ratio. The signal output from the ion detector is processed by the LC/MS system to produce LC/MS data. As appreciated by persons skilled in the art, the LC/MS data may be presented as extracted ion chromatograms (EICs). An EIC is a plot, for a selected m/z ratio, of ion abundance (signal intensity) as a function of acquisition time (also referred to as retention time or elution time), which may be filtered for a selected span of the total acquisition time.

Unexpectedly, the method above is directed to the surprising discovery that addition of medronic acid to the mobile phase leads to dramatically improved peak shape for negatively charged molecules with minimal or no signal suppression observed. More specifically, adding medronic acid to the mobile phase improves peak shape and signal strength for a wide variety of negatively charged molecules including nucleotides, phosphopeptides, and pesticides. Unlike EDTA or ion-pairing reagents, the medronic acid additive is readily cleared from the LC/MS system and does not show a residual signal after multiple chromatography runs. Moreover, LC-MS with the medronic acid additive in the solvent system may be run with a mass spectrometer in both the positive and negative mode analysis. Thus, LC-MS methods with a mobile phase containing a medronic acid additive provide surprisingly improved peak shape and resolution for negatively charged analytes. The inventors also tested pyrophosphoric acid as a mobile phase additive. However, it is well established that pyrophosphoric acid hydrolyzes over time into orthophosphoric acid. See Nelson, A K 1964 *Hydrolysis Rates of Solutions of Pyrophosphoric Acid J Chemical & Engineering Data* 9(3) 357-357. This makes it less desirable as an additive for some applications compared to medronic acid, since the degradation of pyrophosphoric acid solutions over time may lead to inconsistent results. Furthermore, an additive of medronic acid was observed to give improved enhancement of analyte signals compared to an equimolar additive of pyrophosphoric acid. This advantage is demonstrated in FIGS. 3A, 3B, 4A and 4B.

Medronic acid gave superior enhancement of α-ketoglutarate, adenosine monophosphate and L-glutamine compared to an equimolar concentration of pyrophosphoric acid. Medronic acid also caused less suppression for glutamate and malate compared to an equimolar concentration of pyrophosphoric acid.

Generally, the medronic acid may be added to the mobile phase, or to one of the individual solvents utilized to form the mobile phase, at any point upstream of the LC column. In a typical yet non-exclusive embodiment, the mobile phase includes at least two solvents, for example water and an organic compound (e.g., acetonitrile, methanol, etc.). In such case, the solvents are mixed together to form the mobile phase, with the relative concentrations of the two (or more) solvents being fixed (i.e, isocratic mode) or varied over time (i.e., gradient mode) during the course of the chromatographic run. For this purpose, the LC system may include a mixer, which may be a simple tee connection that merges the solvent streams supplied from different solvent reservoirs, or may be a more elaborate configuration designed to enhance the homogeneity of the mixing. The LC system may be configured for high-pressure mixing or low-pressure mixing.

In the high-pressure mixing configuration, the inlets of individual pumps (on the low-pressure side of the pumps) may communicate with individual solvent reservoirs via individual solvent supply lines (e.g., conduits, tubing, etc.). The solvent mixer is positioned downstream from (i.e., on the high-pressure outlet side of) the pumps and is coupled to the outlets of the pumps via respective outlet lines leading to respective inlets of the mixer. For example, one pump may output solvent A at high pressure and another pump may output solvent B at high pressure. The resulting high-pressure solvent streams are then combined in the downstream mixer, thereby forming a multi-solvent (e.g., solvent A+solvent B) mobile phase at the output of the downstream mixer. The relative concentrations of the solvents (mixing ratio) may be controlled by the respective flow rates of the individual solvents from the respective pumps, such as by controlling piston speed in the case of reciprocating piston pumps. Thus, the mixing ratio of the composite solvent serving as the mobile phase, according to either an isocratic or gradient mode of operation, may be controlled by controlling the pumps, as appreciated by persons skilled in the art. The mixer is positioned upstream of the sample injector and the LC column. The pumps drive the mobile phase at the high system pressure from the mixer to the LC column. The sample injector injects a plug of the sample into the high-pressure mobile phase flow path at a point between the mixer and the LC column.

As one non-exclusive example, the sample injector may be or include a multi-port injection valve that includes a sample loop into which the sample may be initially loaded, as appreciated by persons skilled in the art. The injection valve is switchable from a sample loading position at which the sample is loaded into the sample loop (e.g., at or near atmospheric pressure), to a sample injection position at which the sample may be transferred from sample loop into the high-pressure mobile phase flow path. Switching of the injection valve may entail moving (rotating or linearly translating) fluid channels of the injection valve relative to fluid ports of the injection valve to establish different flow paths, as appreciated by persons skilled in the art.

In the high-pressure mixing configuration just described, the additive may be added to one or more of the solvent reservoirs, or to one or more of the solvent supply lines leading to the inlets of the pumps, or to one or more of the outlet lines leading from the pumps to the mixer, or directly to the mixer. Alternatively, the additive may be added to the sample, such that the additive is injected with the sample by the sample injector into the mobile phase flow path.

In the low-pressure mixing configuration (as an alternative to a high-pressure mixing configuration), the mixer is positioned upstream (i.e., on the low-pressure inlet side) of the pump. For example, the mixer may be in the form of a proportioning valve positioned between the solvent reservoirs and the pump. Inlets of the proportioning valve are coupled to the solvent reservoirs via respective solvent supply lines, and the outlet of the proportioning valve is coupled to the inlet of the pump via a common mobile phase delivery line. The proportioning valve is configured to receive flows of individual solvents from the respective solvent reservoirs, mix the solvents, and output the resultant composite solvent (mobile phase) to the inlet of the pump at a selected mixing ratio. The mixing ratio established by the proportioning valve may be constant in the case of an isocratic mode or varied over time in the case of a gradient mode. Thus, the mixing ratio of the composite solvent serving as the mobile phase, according to either an isocratic or gradient mode of operation, may be controlled by controlling the proportioning valve, as appreciated by persons skilled in the art. The pump receives the mobile phase from the proportioning valve and drives the mobile phase at the high system pressure to the LC column. The sample injector injects a plug of the sample into the high-pressure mobile phase flow path at a point between the pump outlet and the LC column.

In the low-pressure mixing configuration just described, the additive may be added to one or more of the solvent reservoirs, or to one or more of the solvent supply lines leading to the inlets of the proportioning valve, or to the common mobile phase delivery line leading from the proportioning valve to the pump, or directly to the proportioning valve. Alternatively, the additive may be added to the sample, such that the additive is injected with the sample by the sample injector into the mobile phase flow path.

As noted above, the output from the LC column may be introduced into the ion source of an MS system, by fluidly coupling th LC column with the ion source in an appropriate manner. In a typical yet non-exclusive embodiment, the ionization device provided in the ion source of the MS system is an electrospray ionization (ESI) device. However, other types of ionization devices suitable for coupling to LC instruments and for the type of sample being analyzed, particularly other types of atmospheric pressure ionization (API) devices, may alternatively be utilized. Examples of other types of API ionization devices include, but are not limited to, other spray-type devices (e.g., thermospray ionization devices, etc.), atmospheric-pressure chemical ionization (APCI) devices, atmospheric-pressure photoionization (APPI) devices, atmospheric-pressure plasma-based devices, etc.

In a typical yet non-exclusive embodiment, the mass analyzer provided in the MS system is a time-of-flight (TOF) analyzer or a multipole (e.g., quadrupole) analyzer (e.g., a linear multipole electrode assembly or a three-dimensional Paul trap). Other examples of mass analyzers that may be suitable for implementing the methods disclosed herein include, but are not limited to, electrostatic traps (e.g. Kingdon, Knight and ORBITRAP® traps), ion cyclotron resonance (ICR) or Penning traps (such as utilized in Fourier transform ion cyclotron resonance mass spectrometry (FT-ICR or FTMS)), electric field sector instruments, magnetic field sector instruments, etc.

In some embodiments, the MS system may be configured for tandem MS, or MS$^n$. For example, the MS system may include a first mass analyzer (e.g., a quadrupole mass filter) followed by an ion fragmentation device, which in turn is followed by a second (final) mass analyzer (e.g., a quadrupole mass analyzer or TOF analyzer). For example, from the ions received from the ion source, the first mass analyzer may be tuned to pass a precursor (parent) ion of only a single mass (m/z ratio) onward to the ion fragmentation device. The ion fragmentation device is configured to break the precursor ion into fragment ions (product ions or daughter ions). The fragment ions are then analyzed (mass-resolved) by the second mass analyzer and detected by the ion detector, from which fragment ion spectra are produced. The ion fragmentation device may be configured to perform, for example, collision-induced dissociation (CID), electron capture dissociation (ECD), electron transfer dissociation (ETD), infrared multiphoton dissociation (IRMPD), etc. Examples of these types of configurations include those often labeled QqQ and QqTOF, as appreciated by persons skilled in the art.

As appreciated by persons skilled in the art, depending on the embodiment, the MS system may include one or more intermediate ion processing devices positioned in the ion process flow between the ion source and the (final) mass analyzer. In addition to mass analyzers/filters and ion fragmentation devices as noted above, such intermediate ion processing devices may include, for example, ion guides, ion traps, ion funnel-based devices, and various ion beam optics configured for performing various ion beam manipulating functions such as focusing, shaping, steering, deflecting, cooling (thermalizing), accelerating, decelerating, slicing, etc.

Depending on the embodiment, the ion detector provided in the mass spectrometer may be, for example, an electron multiplier (EM), a photomultiplier, a micro-channel plate (MCP) detector, a Faraday cup, etc.

The LC/MS system may also include a system controller (e.g., computing device) configured for controlling, monitoring and/or timing the operation of various devices of the LC/MS system. One or more modules of the controller may be, or be embodied in, for example, a computer workstation, desktop computer, laptop computer, portable computer, tablet computer, handheld computer, mobile computing device, personal digital assistant (PDA), smartphone, etc. The controller may include one or more electronic processors, memories, databases, etc. The controller may be configured for receiving the ion measurement signals from the ion detector and performing tasks relating to data acquisition and signal analysis as necessary to generate LC/MS data (e.g., chromatograms, mass spectra, 3D plots or pseudo 3D heat maps, etc.) characterizing the sample under analysis. The controller may also be configured for providing and controlling a user interface that provides screen displays of LC/MS data and other data with which a user may interact. The controller may also be configured for executing data processing algorithms such as for deconvolution of the LC/MS data. The controller may include one or more reading devices on or in which a non-transitory or tangible computer-readable (machine-readable) medium may be loaded that includes instructions for performing all or part of any of the methods disclosed herein. For all such purposes, the controller may be in electrical communication with various components of the LC/MS system via wired or wireless communication links. Also for these purposes, the controller may include one or more types of hardware, firmware and/or software, as appreciated by persons skilled in the art.

It will be understood that the operation and design of LC and MS systems and their various components are generally known to persons skilled in the art, and thus need not be described in detail herein. Instead, certain components and functional aspects have been briefly described above to facilitate an understanding of the subject matter presently disclosed.

Non-limiting examples of methods for analyzing one or more analytes in a sample by LC/MS are described below.

Example 1

EDTA as a Mobile Phase Additive

Figure 1B:
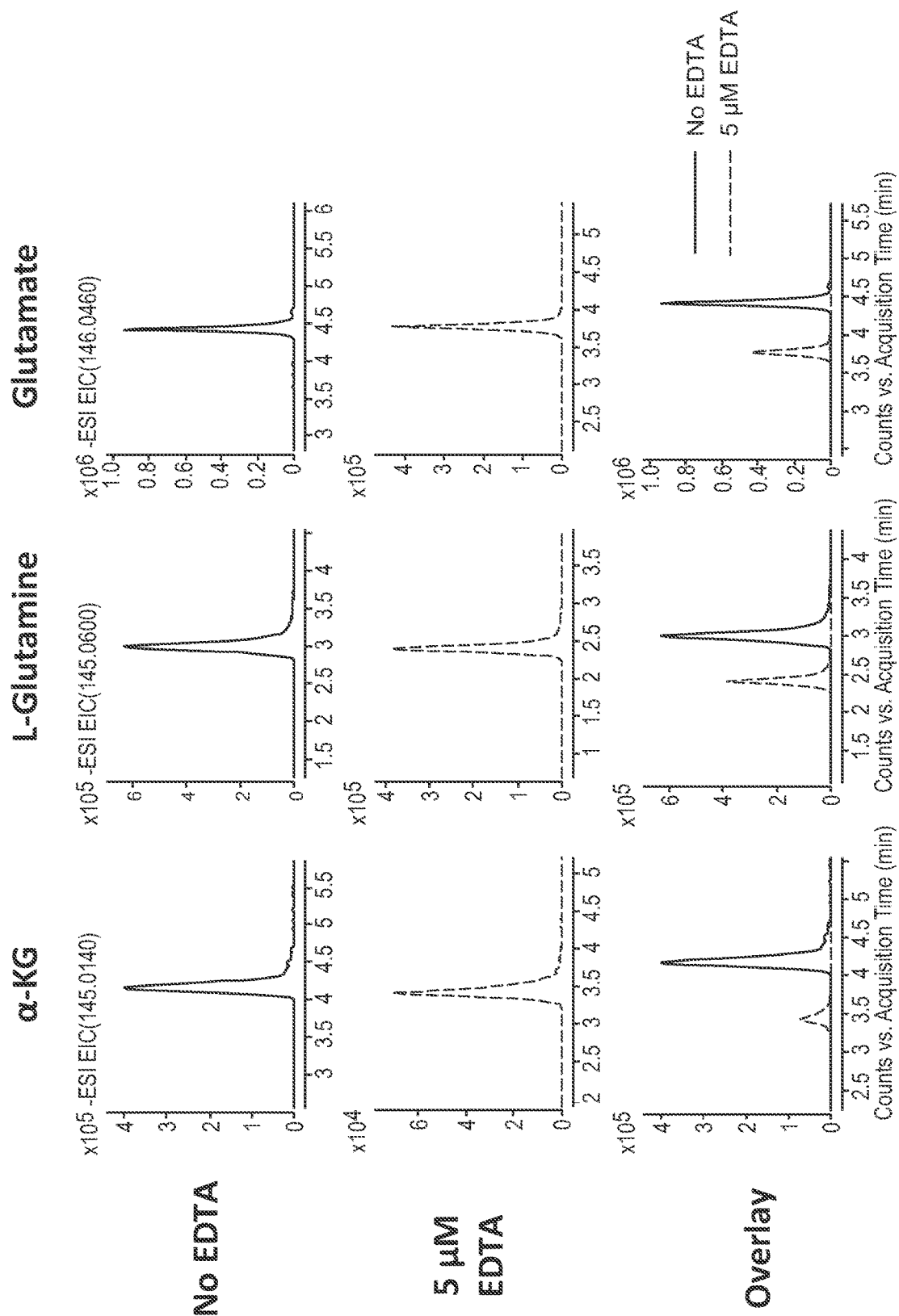
FIG. 1B shows the effect of EDTA addition to the mobile phase on peak shape for organic acids, α-ketoglutarate (α-KG), L-glutamine and glutamate.
Figure 1C:
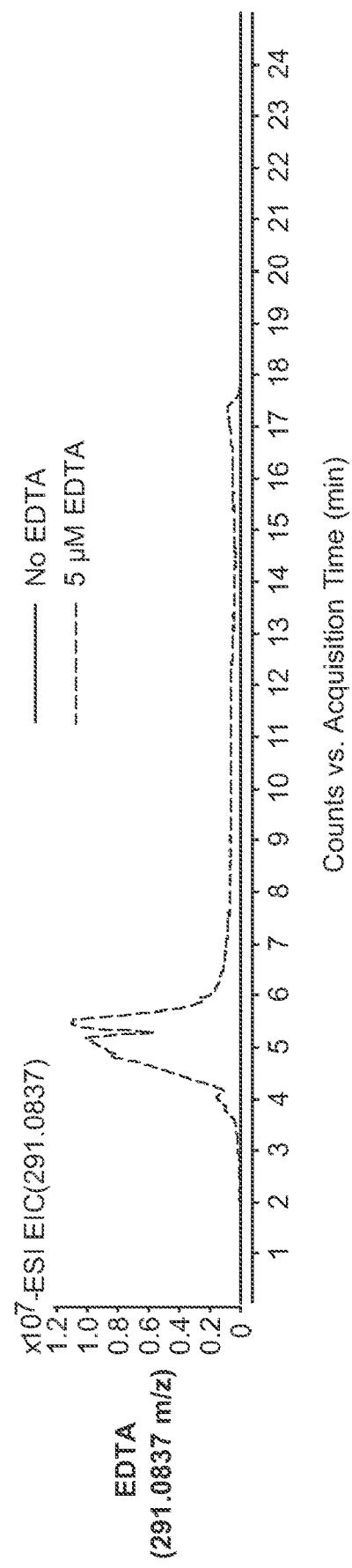
FIG. 1C shows the chromatogram for EDTA across the analytical run.

As discussed in the background, there are reports in the literature on the use of EDTA to improve performance of LC. See Pesek et al. 2011 and Myint et al. 2009. To study that further several experiments were performed. Samples (15 ng) of organic acids (succinate, malate, citrate/isocitrate, α-ketoglutarate (α-KG), L-glutamine, and glutamate (Sigma Aldrich, St. Louis, Mo.) were analyzed on a HILIC column at pH 9.0 with 10 mM ammonium acetate with or without 5 µM EDTA in the eluent. The connection capillaries were PEEK-lined with a 1290 Binary Pump coupled to a 6545 Q-TOF instrument (Agilent Technologies, Inc., Santa Clara, Calif.). Solvent A consisted of 10 mM ammonium acetate (pH 9.0) in water. Solvent B consisted of 10 mM ammonium acetate (pH 9.0) in 90:10 acetonitrile/water. The flow rate was 0.25 ml/min and a sample volume of 3 µl was injected onto the column for each experiment. After loading of the sample solution, the column was conditioned with 90% solvent B for 2 min before the gradient with solvent A was applied. The gradient elution profile was from 90 to 40% B for 10 min and then washed with 20% B for 3 min. The column was equilibrated with 90% B for 8 min prior to subsequent analysis. Full MS (MS1) data was acquired with a mass range of 50-1000 m/z and acquisition rate of 1 spectrum/s on the 6545 Q-TOF system. The instruments were set at negative mode for the analysis. The results are shown in FIGS. 1A-1C. Peak shapes improved for malate and citrate with the addition of EDTA, however, signal intensity decreased for all metabolites due to ion suppression by EDTA.

Figure 2A:
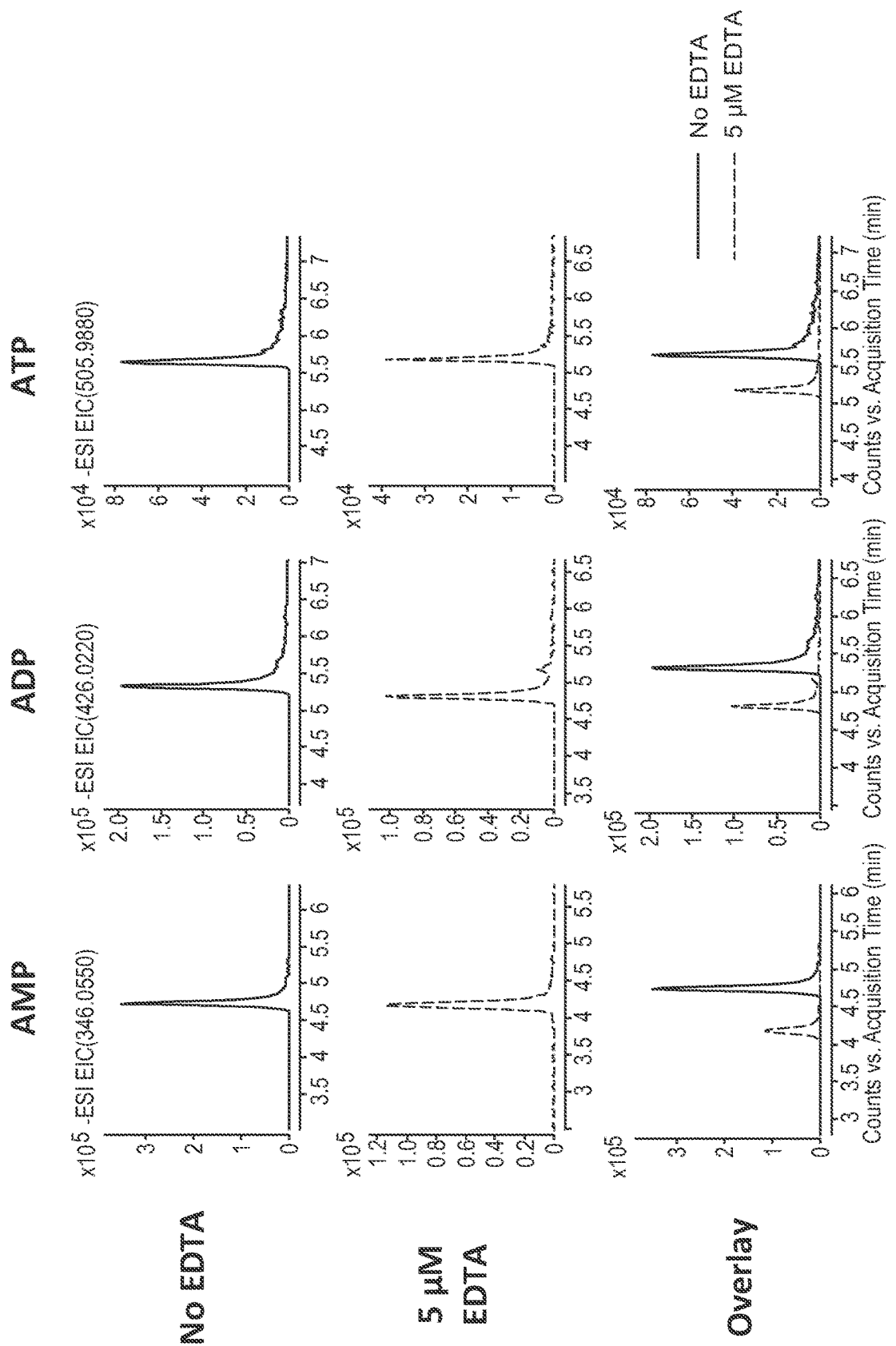
FIG. 2A shows the effect of EDTA addition to the mobile phase on peak shape for phosphorylated biomolecules, adenosine monophosphate (AMP), adenosine diphosphate (ADP), and adenosine triphosphate (ATP).
Figure 2B:
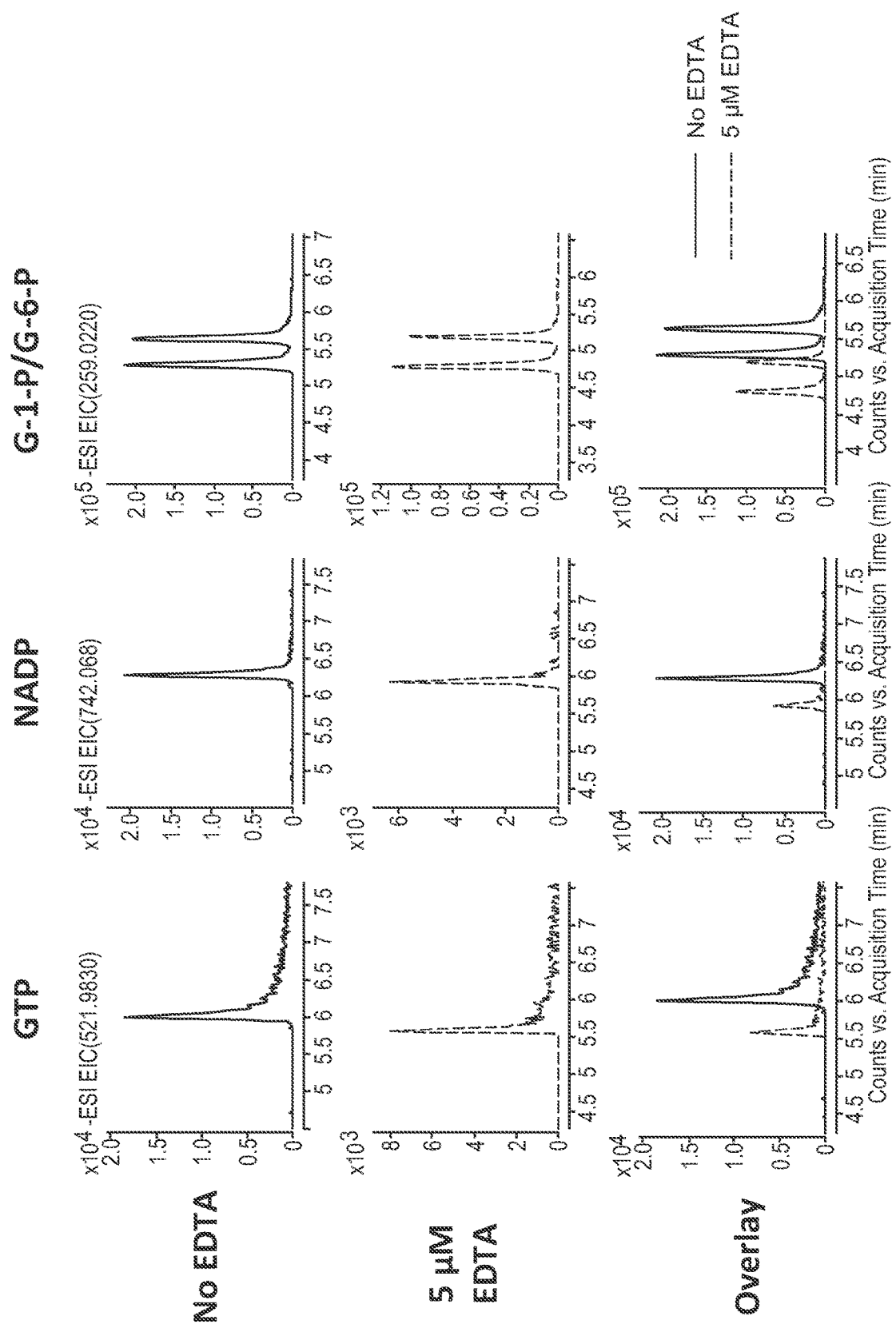
FIG. 2b shows the effect of EDTA addition to the mobile phase on peak shape for phosphorylated biomolecules, guanosine triphosphate (GTP), nicotinamide adenine dinucleotide phosphate (NADP), and glucose-1-phosphate (G-1-P)/glucose-6-phosphate (G-6-P).
Figure 2C:
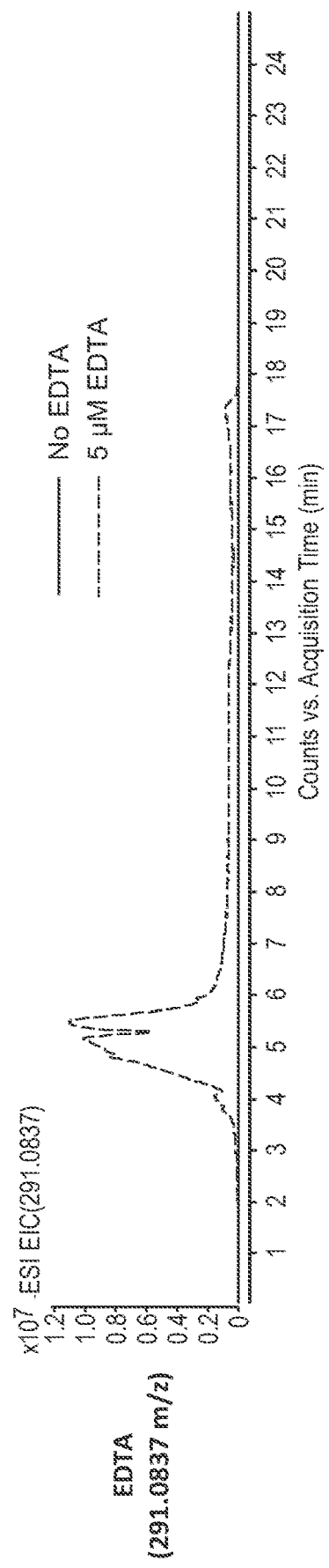
FIG. 2C shows the chromatogram for EDTA across the analytical run.

In another set of experiments samples (15 ng) of phosphorylated biomolecules were analyzed on the HILIC column at pH 9.0 with 10 mM ammonium acetate, with or without 5 µM EDTA in the eluent. Specifically, adenosine monophosphate (AMP), adenosine diphosphate (ADP), adenosine triphosphate (ATP), guanosine triphosphate (GTP), nicotinamide adenine dinucleotide phosphate (NADP), and glucose-1-phosphate (G-1-P)/glucose-6-phosphate (G-6-P) were studied (Sigma Aldrich). The results are shown in FIGS. 2A-2C. Peak shapes improved for phosphorylated compounds with the addition of EDTA, however, signal intensity decreased for all metabolites due to ion suppression by EDTA.

Example 2

Pyrophosphoric Acid as a Mobile Phase Additive

Figure 3A:
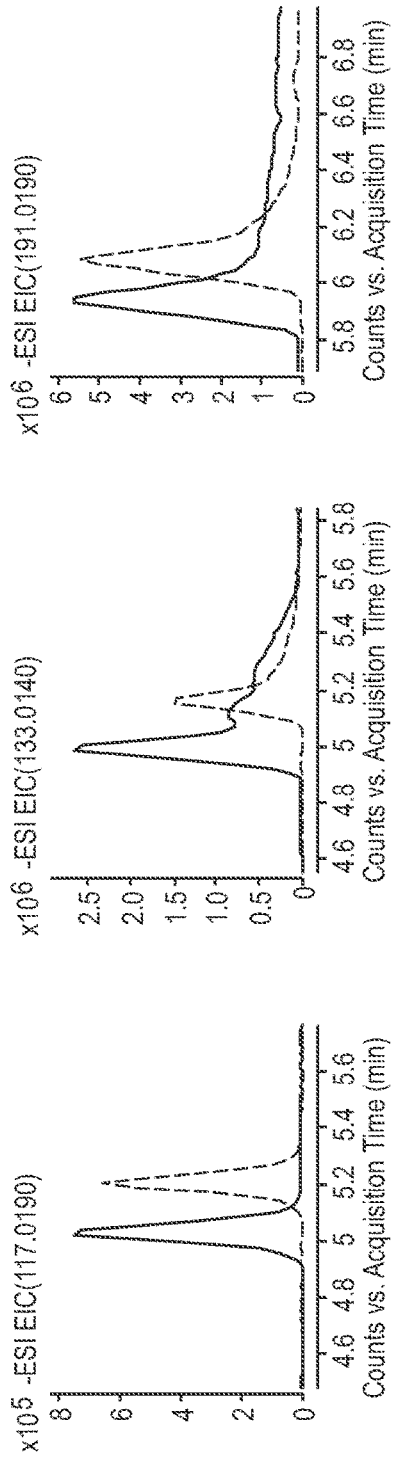
FIG. 3A shows the effect of pyrophosphoric acid addition to the mobile phase on peak shape for several organic acids and phosphorylated biomolecules.
Figure 3A:
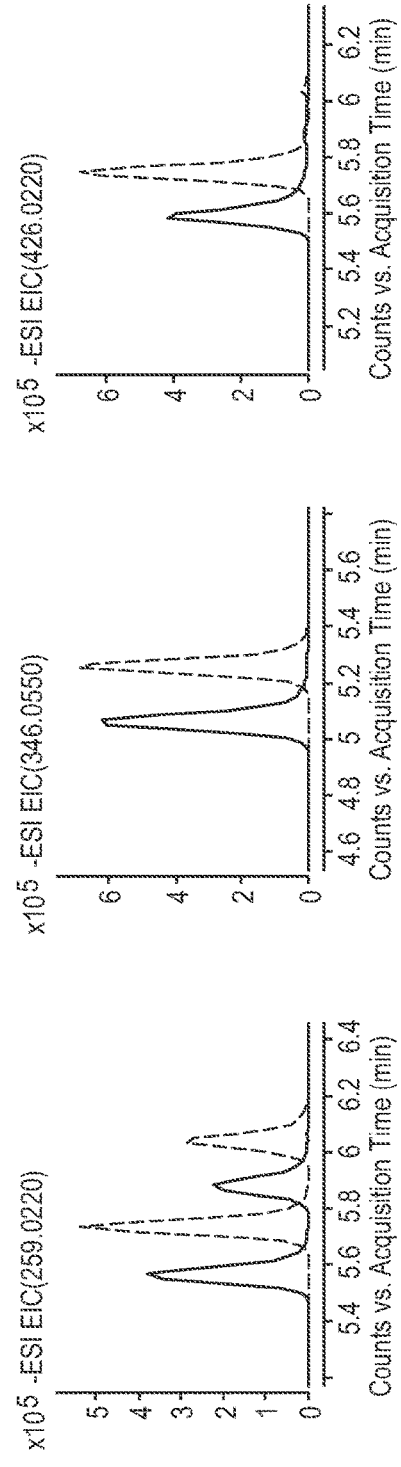
Figure 3B:
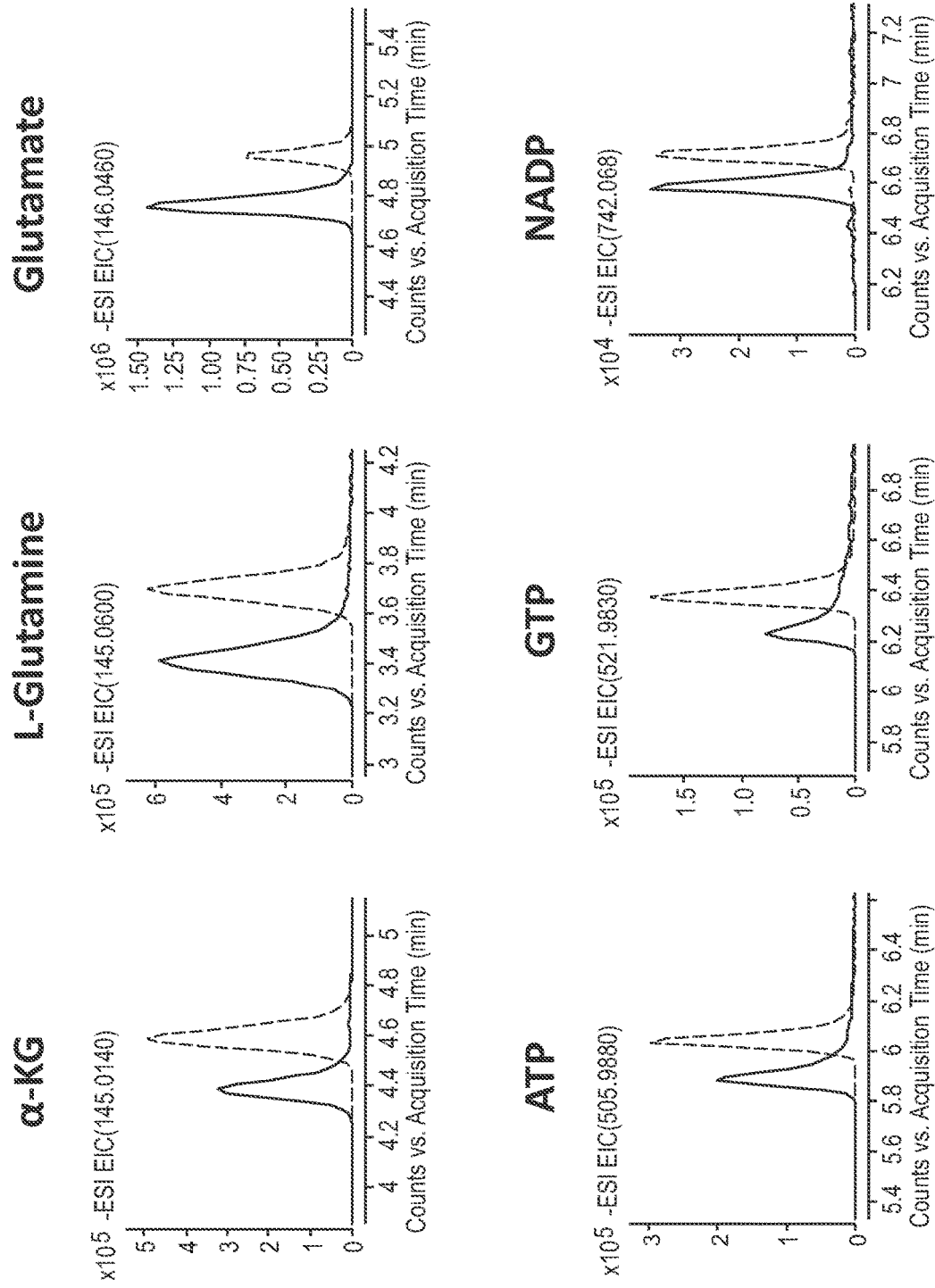
FIG. 3B shows the effect of pyrophosphoric acid addition to the mobile phase on peak shape for several other organic acids and phosphorylated biomolecules.
Figure 3C:
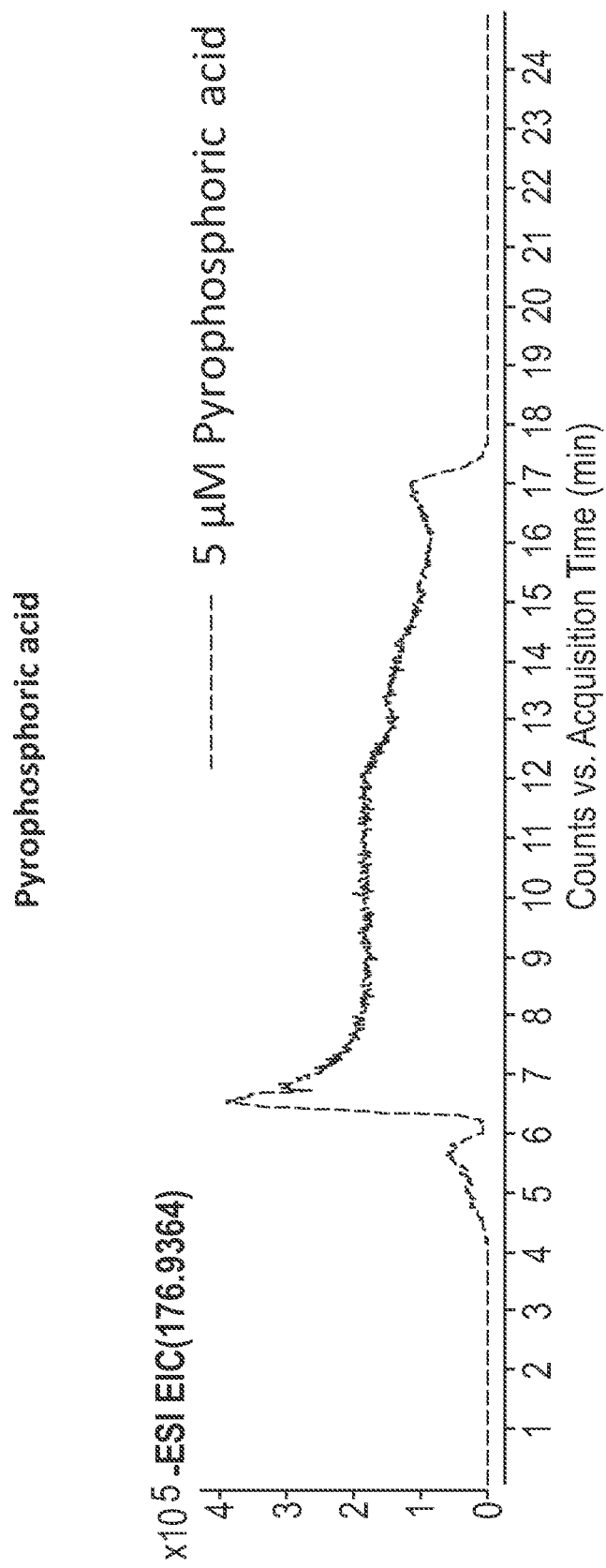
FIG. 3C shows the chromatogram for pyrophosphoric acid across the analytical run.

Samples (15 ng) were analyzed on the HILIC column with mobile phases containing 10 mM ammonium acetate, pH 9.0, with or without 5 µM pyrophosphoric acid in the eluent. The connection capillaries were PEEK-lined with a 1290 Binary Pump coupled to a 6545 Q-TOF instrument. The results are shown in FIGS. 3A-3B. Phosphorylated compounds and organic acids exhibited better peak shapes with the addition of 5 µM pyrophosphoric acid in the mobile phase. Surprisingly, the ion suppression effects observed with EDTA addition were not observed with pyrophosphoric acid as the additive.

Example 3

Medronic Acid as a Mobile Phase Additive

Figure 4A:
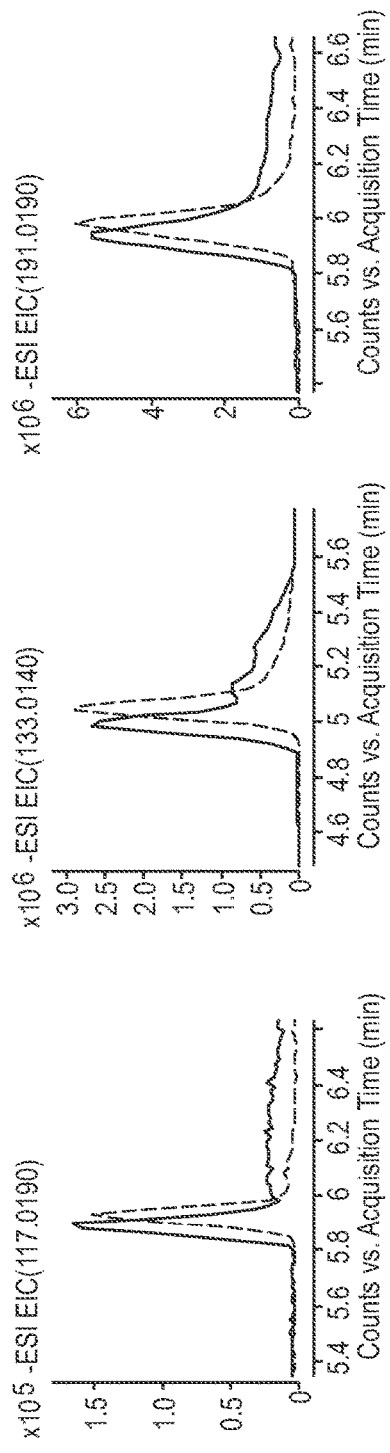
FIG. 4A shows the effect of medronic acid addition to the mobile phase on peak shape for several organic acids and phosphorylated biomolecules.
Figure 4A:
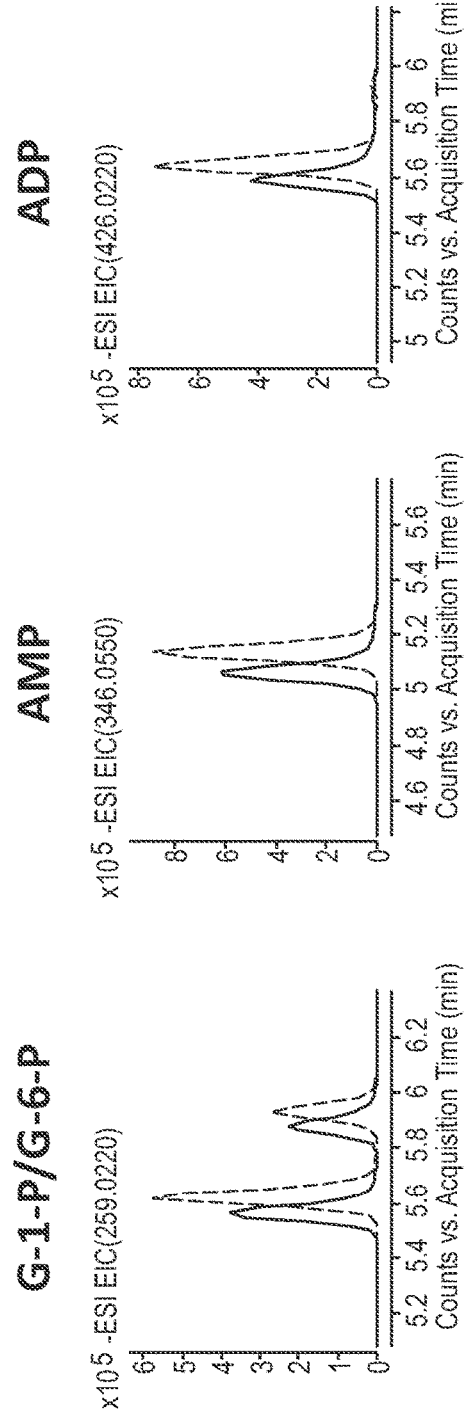
Figure 4B:
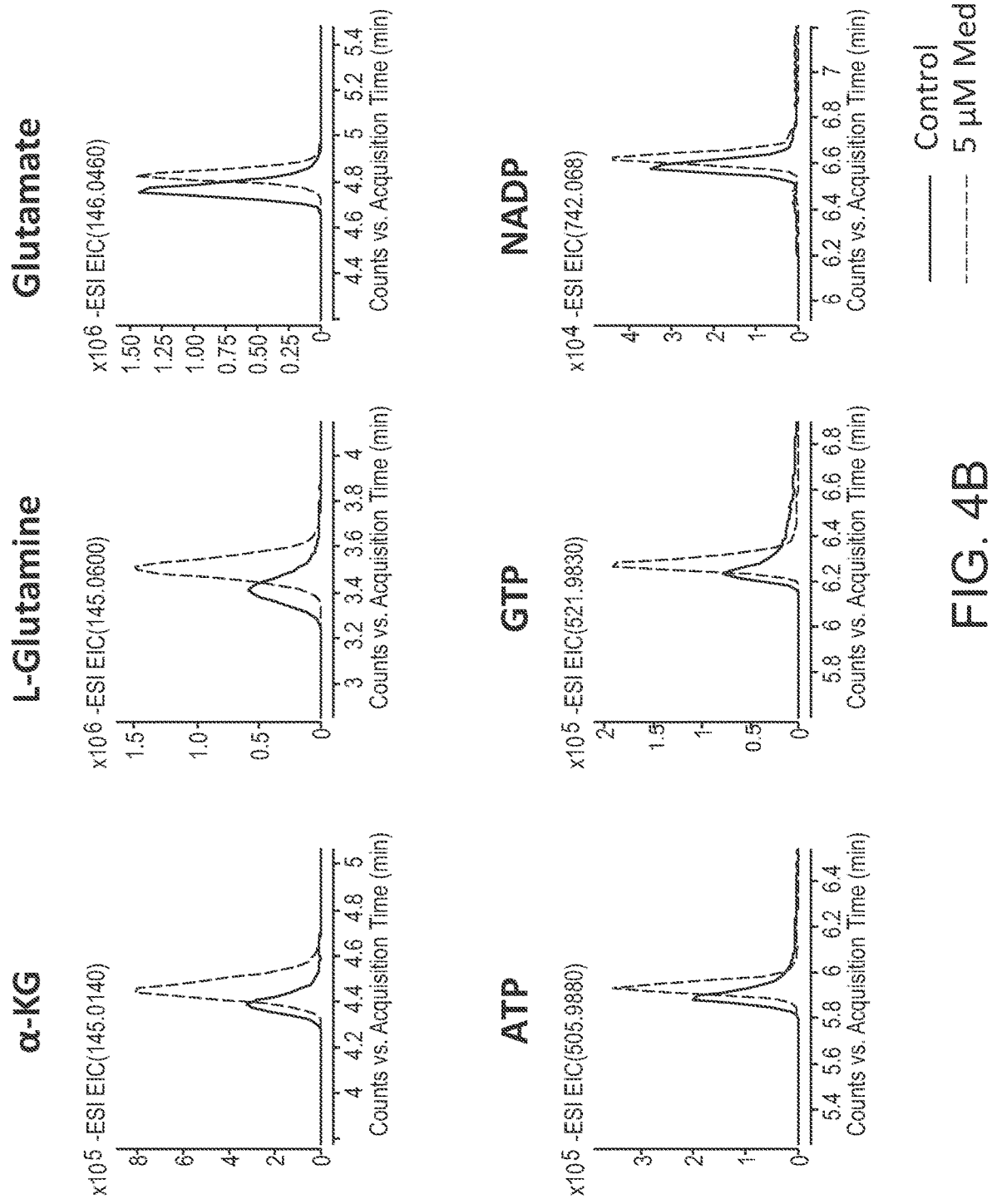
FIG. 4B shows the effect of medronic acid addition to the mobile phase on peak shape for several other organic acids and phosphorylated biomolecules.
Figure 4C:
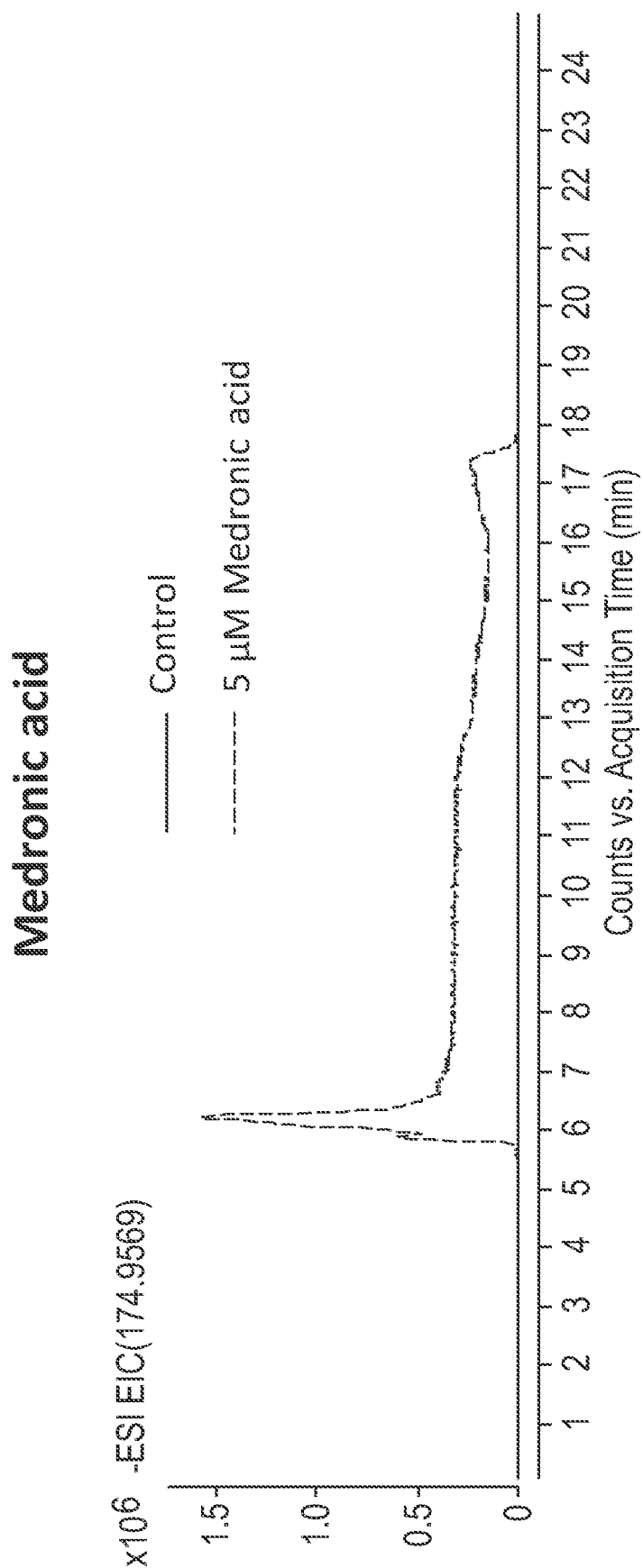
FIG. 4C shows the chromatogram for medronic acid alone.

Samples (15 ng) were analyzed on the HILIC column with mobile phases containing 10 mM ammonium acetate, pH 9.0, with or without 5 µM medronic acid in the eluent. The connection capillaries were PEEK-lined with a 1290 Binary Pump coupled to a 6545 Q-TOF instrument. The results are shown in FIGS. 4A-4B. The phosphorylated compounds and organic acids exhibited better peak shapes with the addition of 5 µM medronic acid in the mobile phase. Surprisingly, the ion suppression effects observed with EDTA addition were not observed here. More importantly, medronic acid yields better results than pyrophosphoric acid, and thus functions as a better mobile phase additive.

Figure 5A:
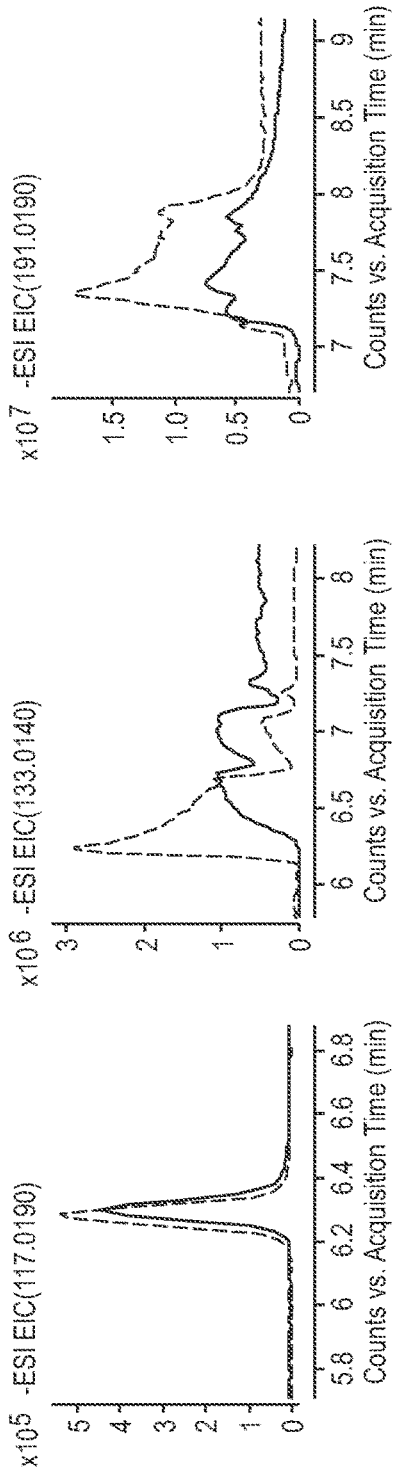
FIG. 5A shows the effect of medronic acid addition to the mobile phase on peak shape for organic acids and phosphorylated biomolecules in a stainless steel (SSTL) system.
Figure 5A:
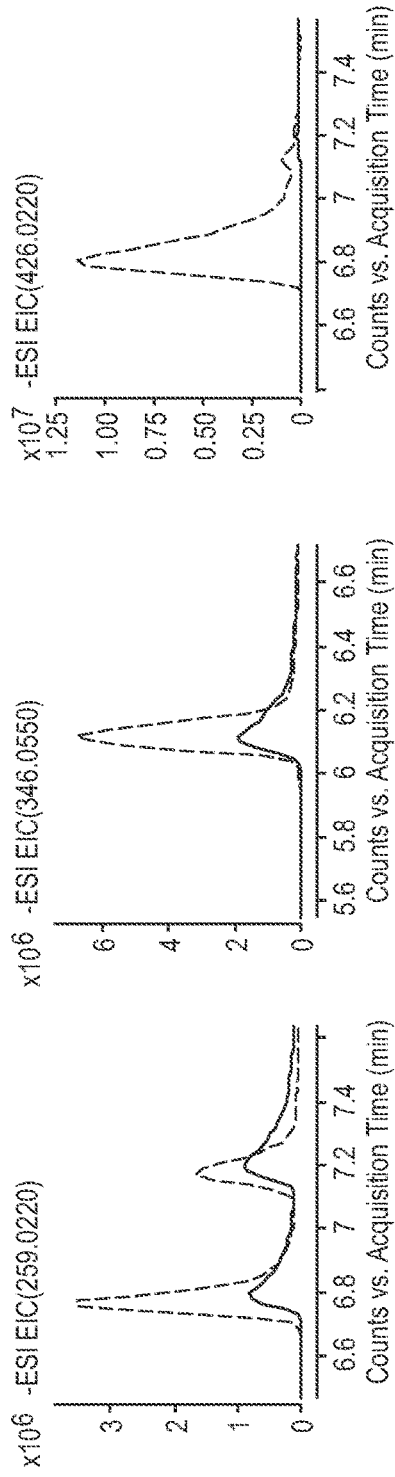
Figure 5B:
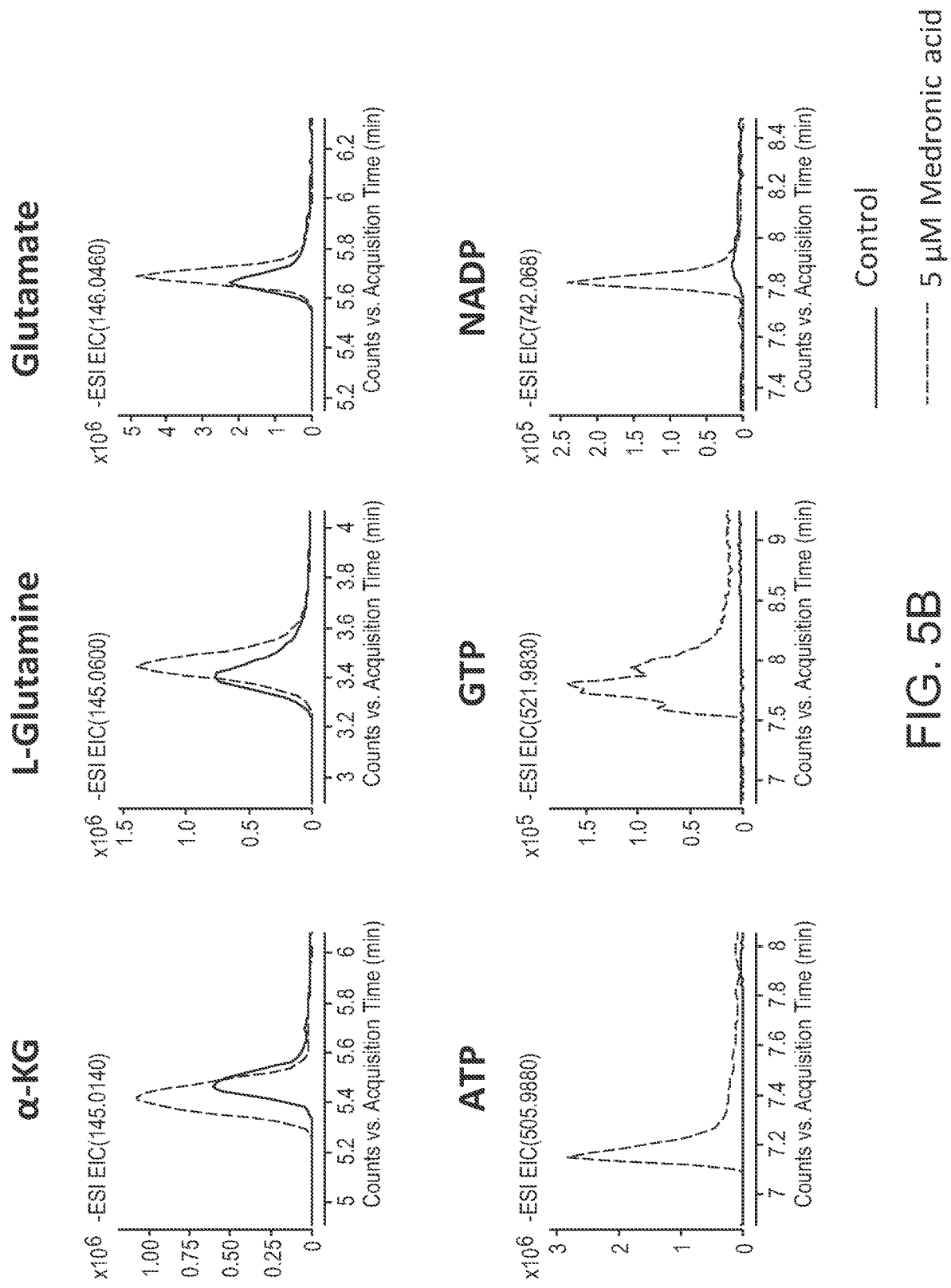
FIG. 5B shows the effect of medronic acid addition to the mobile phase on peak shape for organic acids and phosphorylated biomolecules in a stainless steel (SSTL) system.

Using a second liquid chromatography system 15 ng of sample were analyzed on the HILIC column in stainless steel (SSTL) hardware with 10 mM ammonium acetate, pH 9.0, with or without 5 µM medronic acid as the mobile phase solvent. All of the connection capillaries were also SSTL, except for the connection capillary between the column and the mass spectrometer, which was PEEK. The mobile phases were switched after 5 consecutive runs. The results are shown in FIGS. 5A-5B. In the SSTL system, similar to the results above, the peak shape and signal strength improved by the addition of medronic acid. The results improved dramatically for the phosphorylated compounds, particularly for the nucleoside di- and triphosphates and NADP.

Example 4

In Depth Studies of Medronic Acid as a Mobile Phase Additive

Figure 6A:
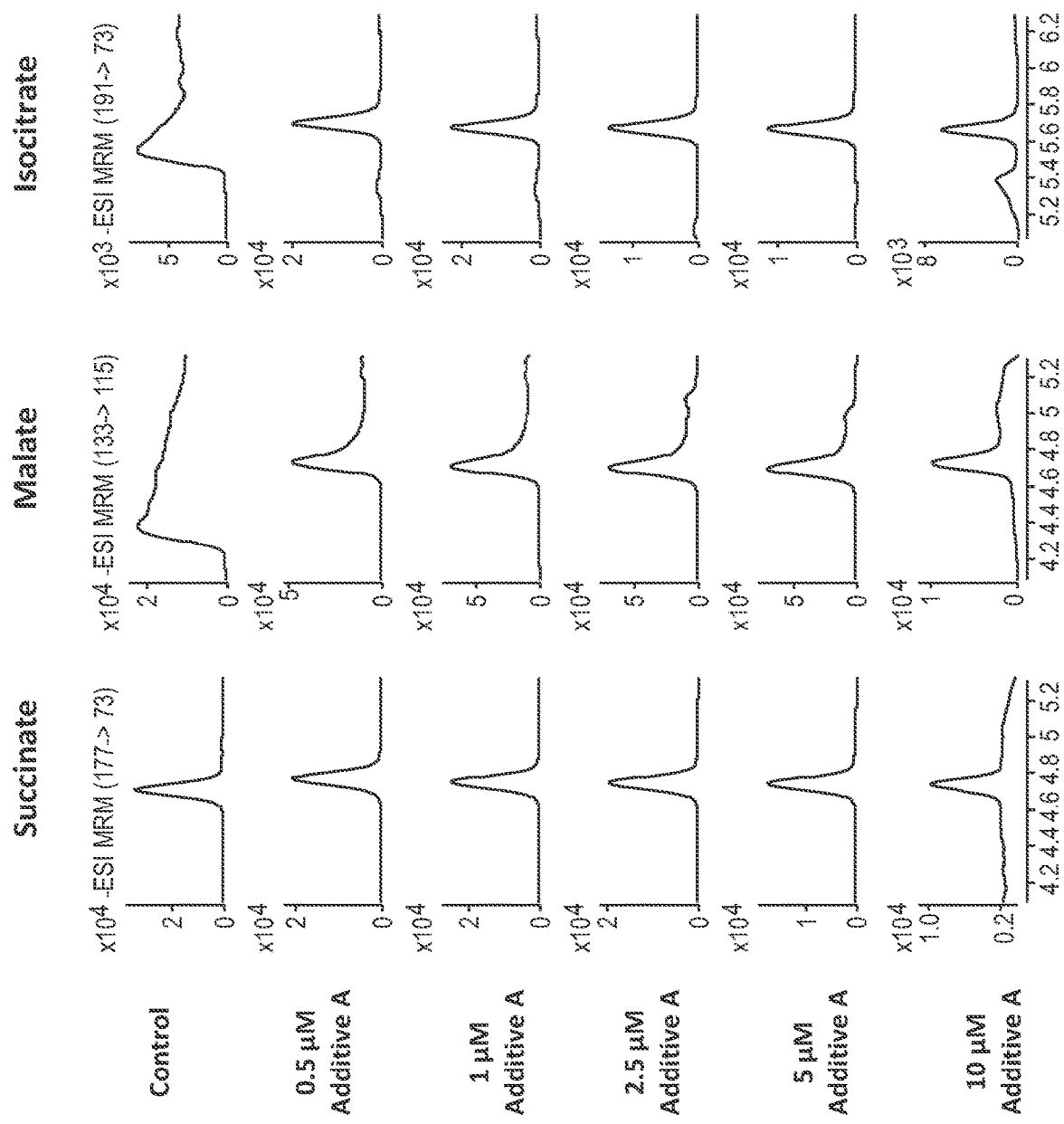
FIG. 6A shows the effect of increasing concentrations of medronic acid (the additive) on peak shape for organic acids.
Figure 6B:
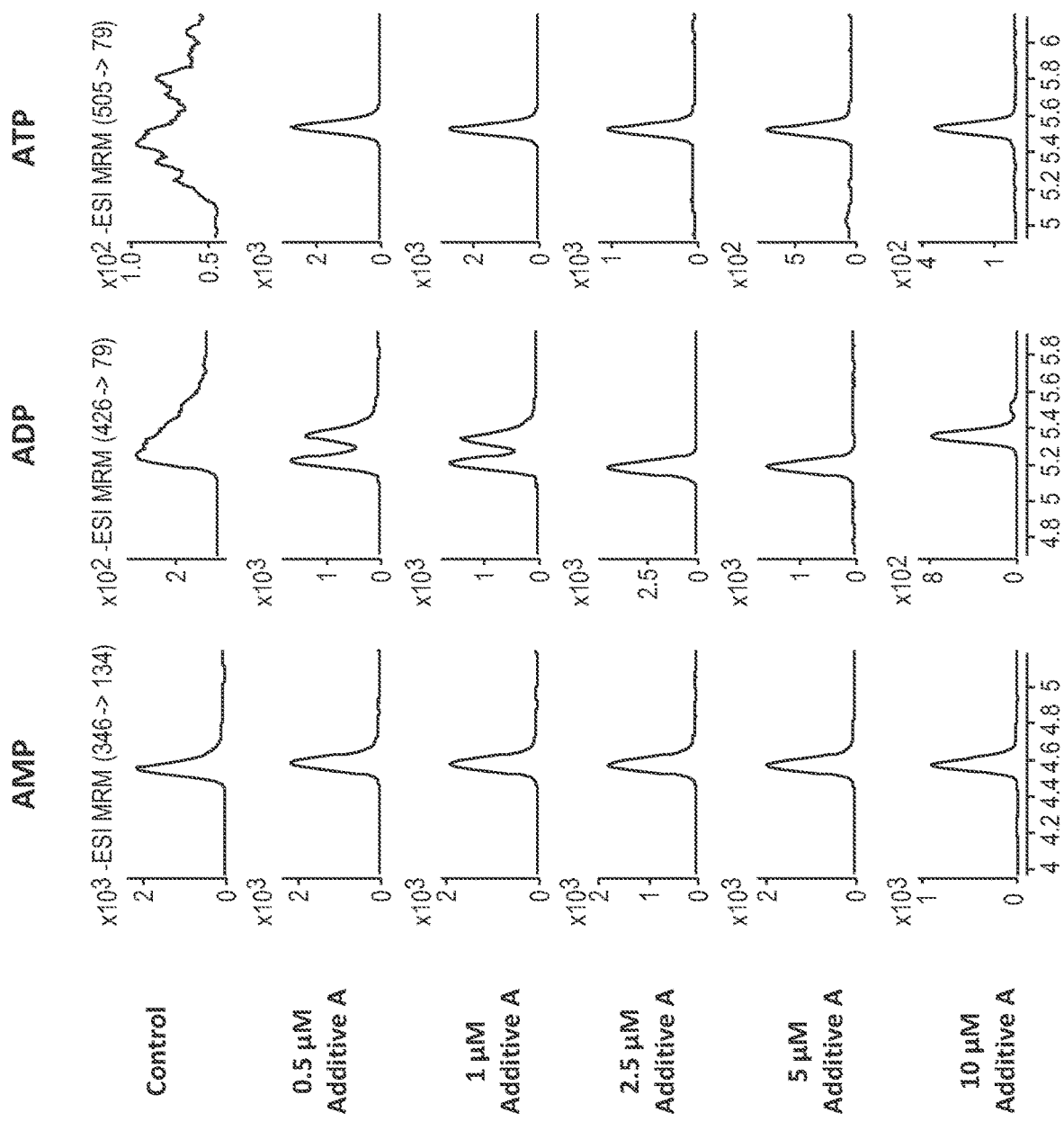
FIG. 6B shows the effect of increasing concentrations of medronic acid (the additive) on peak shape for phosphorylated biomolecules.

In this set of experiments, 1 ng of sample of organic acids or phosphorylated biomolecules were analyzed on the HILIC column with 10 mM ammonium acetate, pH 9.0, with additive A (medronic acid) at the indicated concentrations. See FIG. 6A-6B. The connection capillaries were PEEK-lined with a 1290 Binary Pump coupled to a 6490 iFunnel QQQ instrument (Agilent Technologies, Inc.). The reagents and chromatographic condition are the same as described in Example 1. An MRM method was set up to acquire data on the 6490 iFunnel QQQ system. The instruments were set at negative mode for the analysis. The mobile phases were switched after 5 consecutive runs. The results are shown in FIGS. 6A-6B. As medronic acid concentration increased in the mobile phase solvent, the signal strength and peak shape for the targeted analytes increased as well. For some anionic compounds at higher concentrations, ion suppression of the signal strength was observed.

Figure 7A:
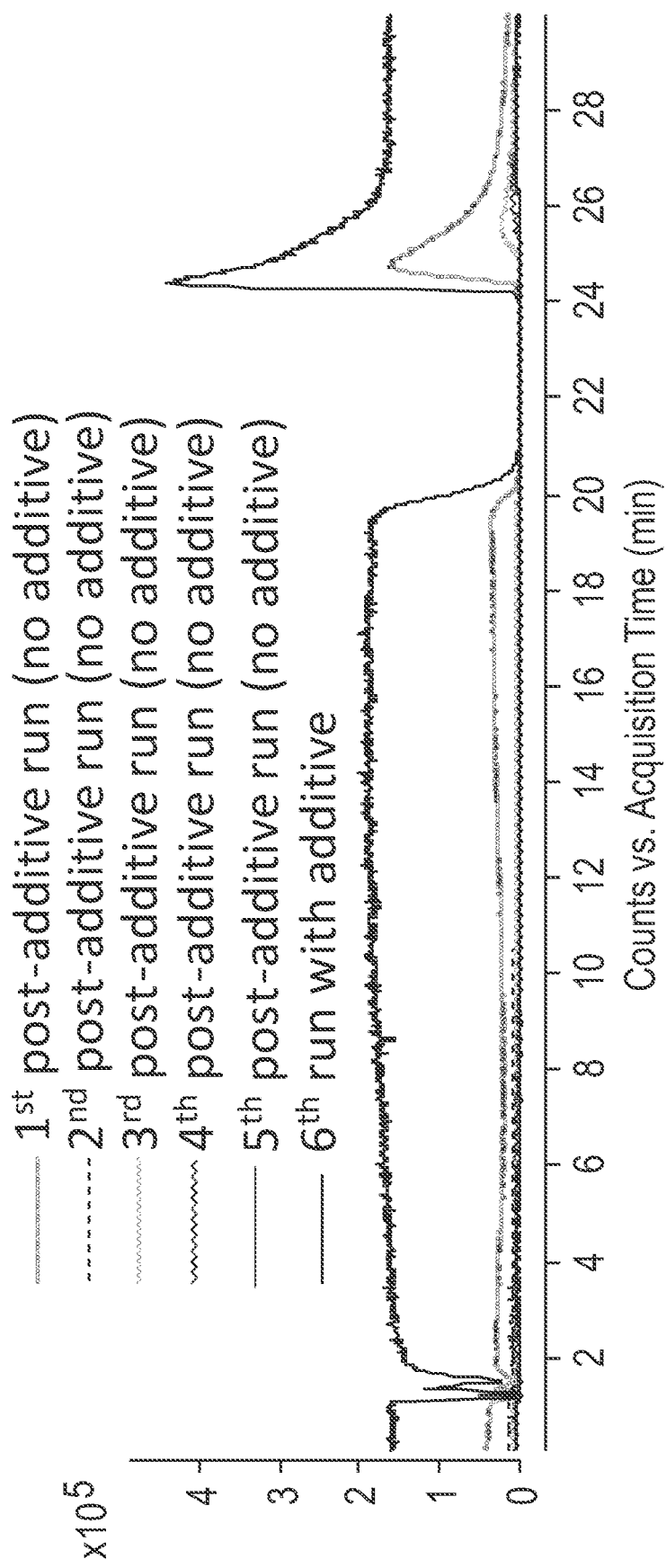
FIG. 7A shows that medronic acid does not linger in the LC system like ion-pairing reagents.
Figure 7B:
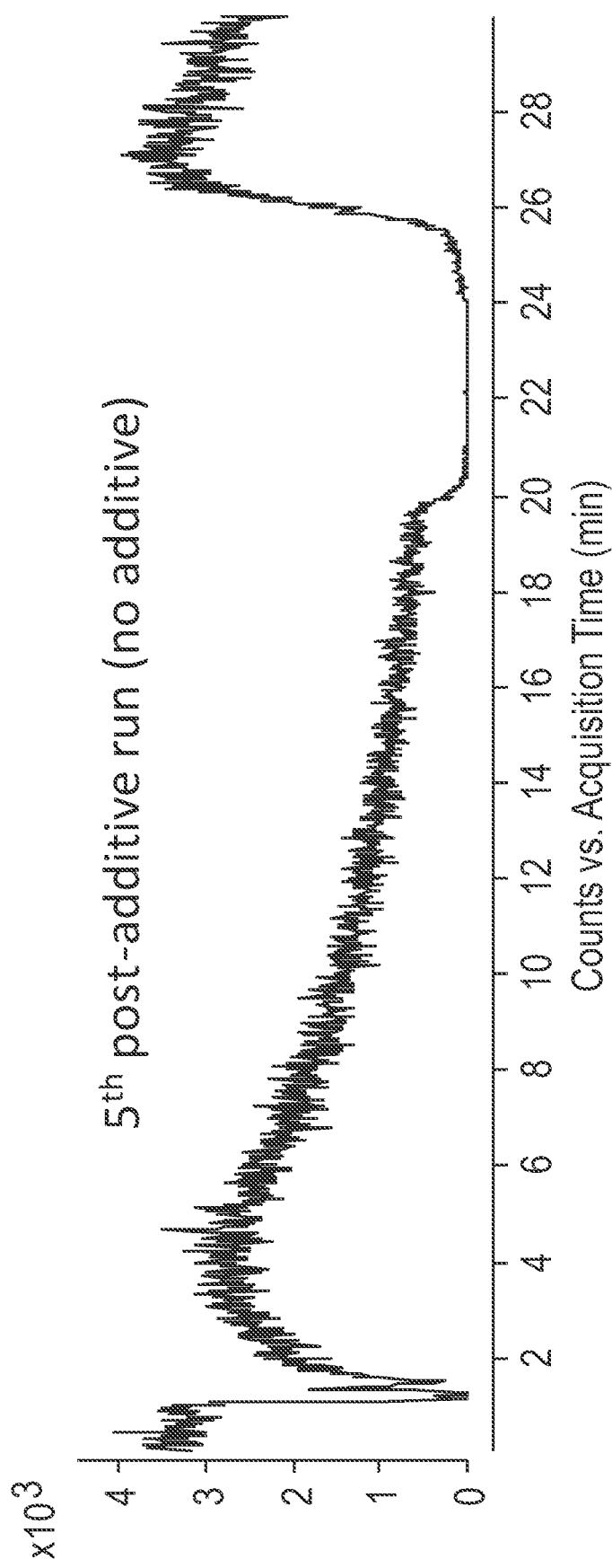
FIG. 7B shows an amplified scale of the 5th run post-additive.

Unlike ion-pairing reagents, medronic acid does not continue to show a signal after multiple runs. After 3 runs (75 min) with medronic acid in the mobile phases, the LC instrument was left overnight, and 3 more runs (75 min) were conducted. The mobile phases were then switched to mobile phases without medronic acid, and 5 runs (125 min) were conducted. The results are shown in FIG. 7A-7B.

Example 5

Figure 8:
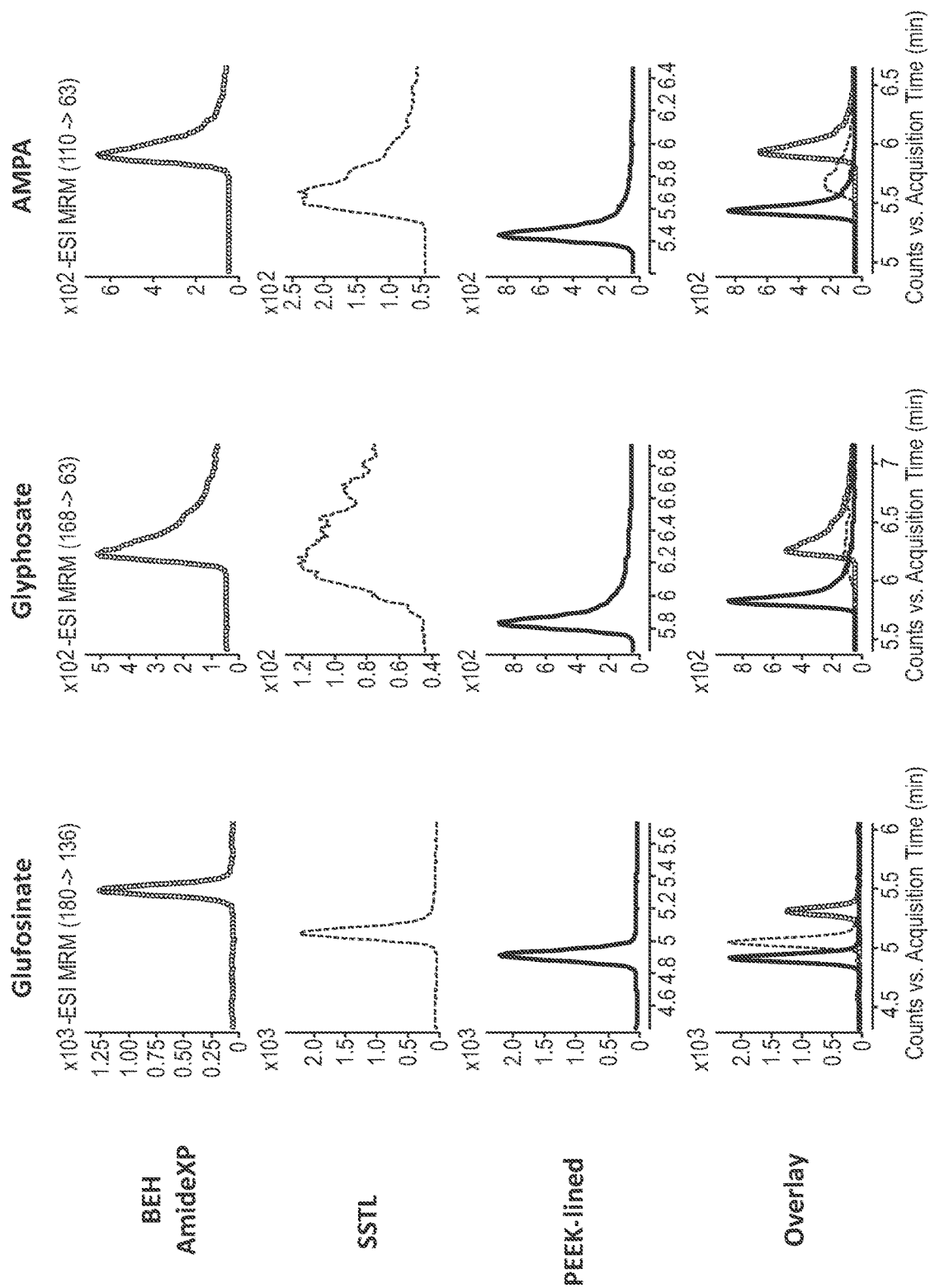
FIG. 8 shows that pesticides containing phosphate groups, such as glyphosate and aminomethylphosphonic acid (AMPA) are sensitive to metal in the sample flow path.
Figure 9:
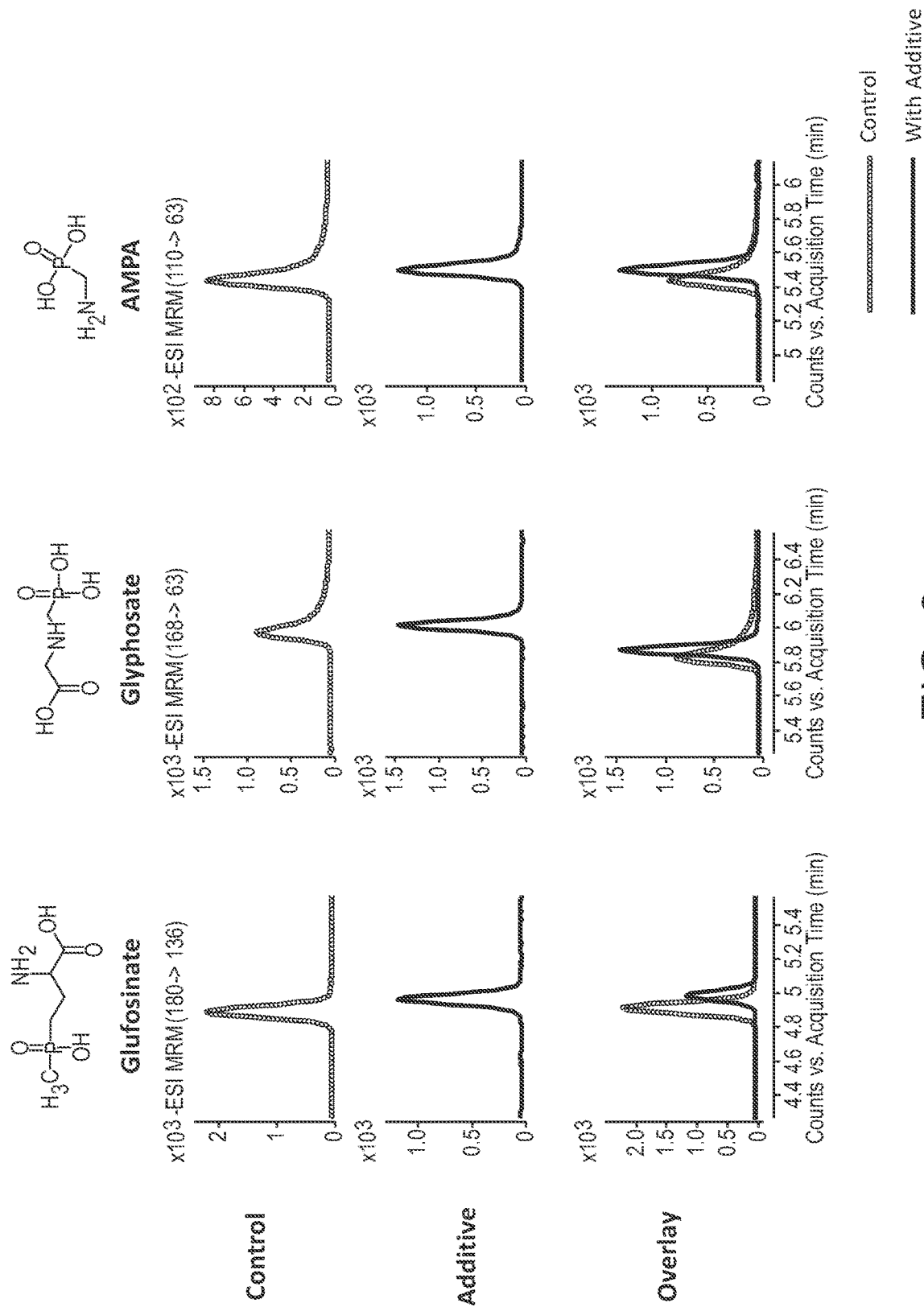
FIG. 9 shows the effect of medronic acid addition to the mobile phase on peak shape and signal for several pesticides.

Column Performance with Medronic Acid as a Mobile Phase Additive 1 ng of pesticide [glufosinate, glyphosate, aminomethylphosphonic acid (AMPA)] was analyzed on Water's BEH AmideXP column (SSTL hardware), SSTL column with HILIC particles packed in SSTL hardware, and PEEK-lined column with HILIC particles packed in PEEK-lined SSTL hardware. 10 mM ammonium acetate, pH 9.0 without additives was used as the mobile phase solvent and analyzed on the 6490 iFunnel QQQ instrument. The results are shown in FIG. 8. These results showed that phosphate containing pesticides such as glyphosate and AMPA are sensitive to metals in the sample flow path. This is evident as decreased signal and poor peak shape was observed for glyphosate and AMPA analyzed on the BEH AmideXP and SSTL column. Whereas PEEK-lined SSTL column yielded much better peak shape and intensity than the other two columns with the SSTL hardware. In contrast, glufosinate, which does not contain a phosphate group, the signal and peak shape was generally not affected. Next, 1 ng of pesticides were analyzed on PEEK-lined SSTL column with 10 mM ammonium acetate, pH 9.0 on the 6490 QQQ instrument. The results are shown in FIG. 9. As expected, for glyphosate and AMPA, the peak shape and signal strength improved with the addition of 5 µM medronic acid to the mobile phase solvents. Interestingly, we observed a slight ion suppression to the glufosinate signal.

Example 6

Figure 10A:
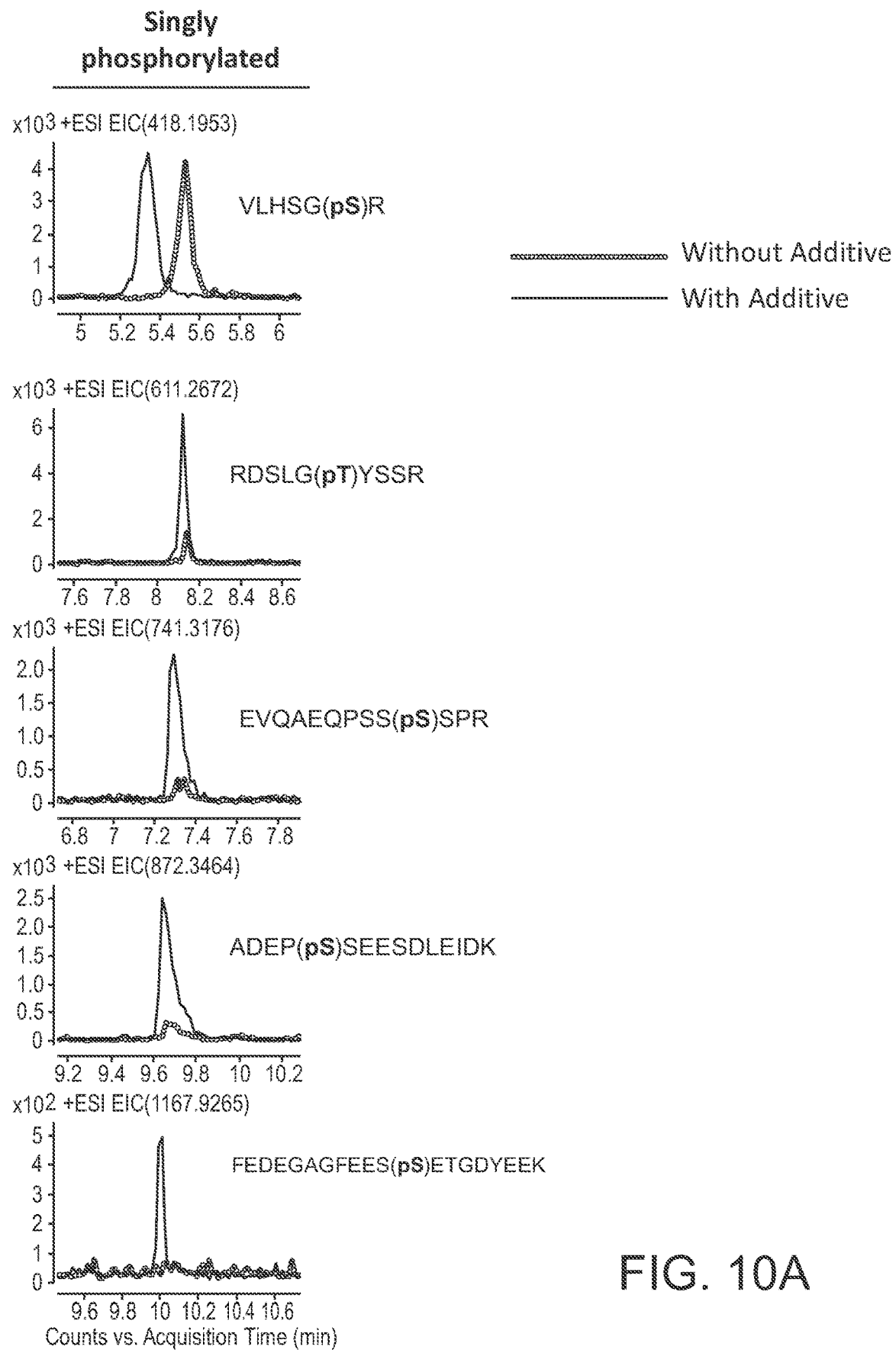
FIG. 10A shows the LC performance for a variety of single phosphorylated phosphopeptides with and without the additive medronic acid.
Figure 10B:
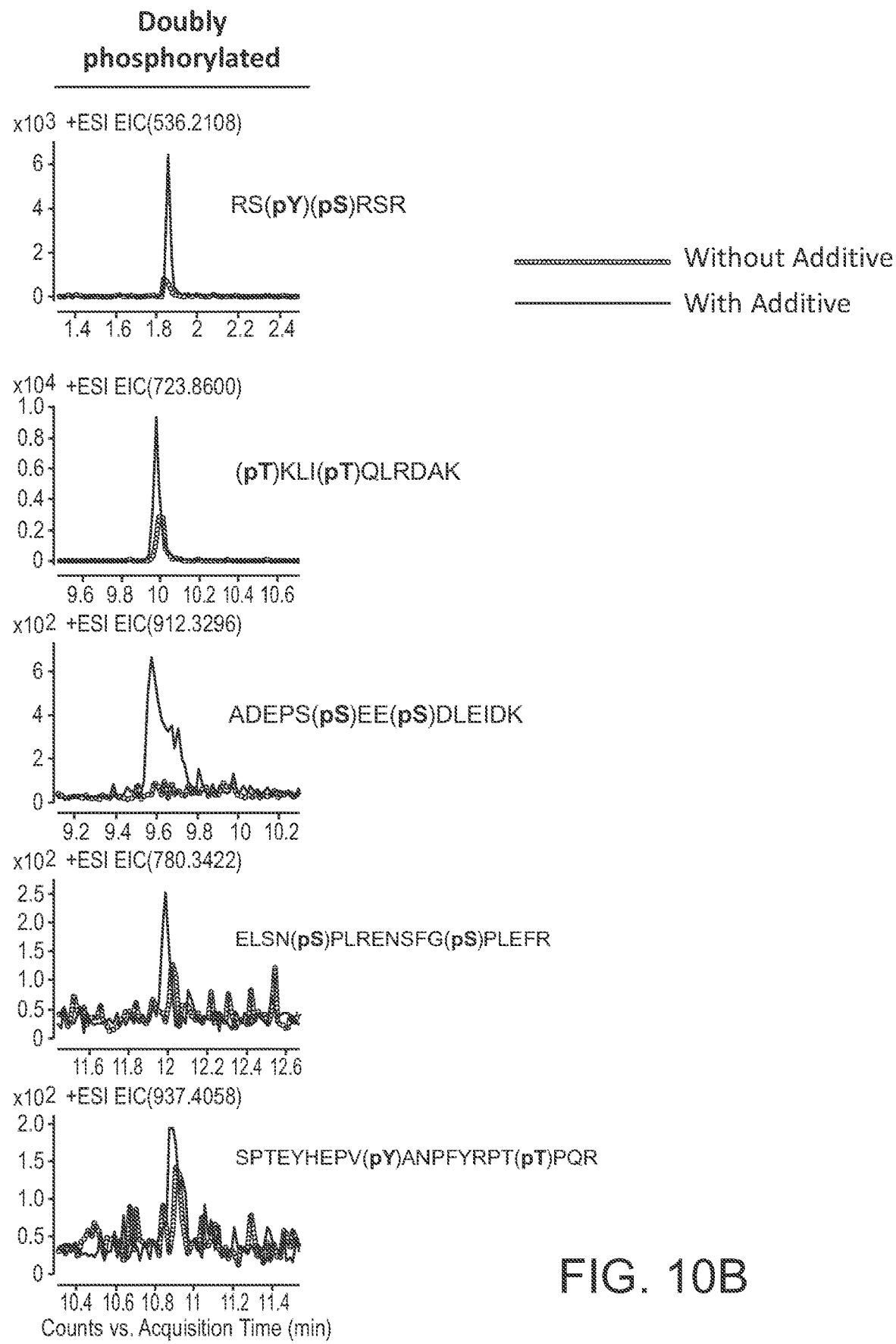
FIG. 10B shows the LC performance for a variety of double phosphorylated phosphopeptides with and without the additive medronic acid.
Figure 10C:
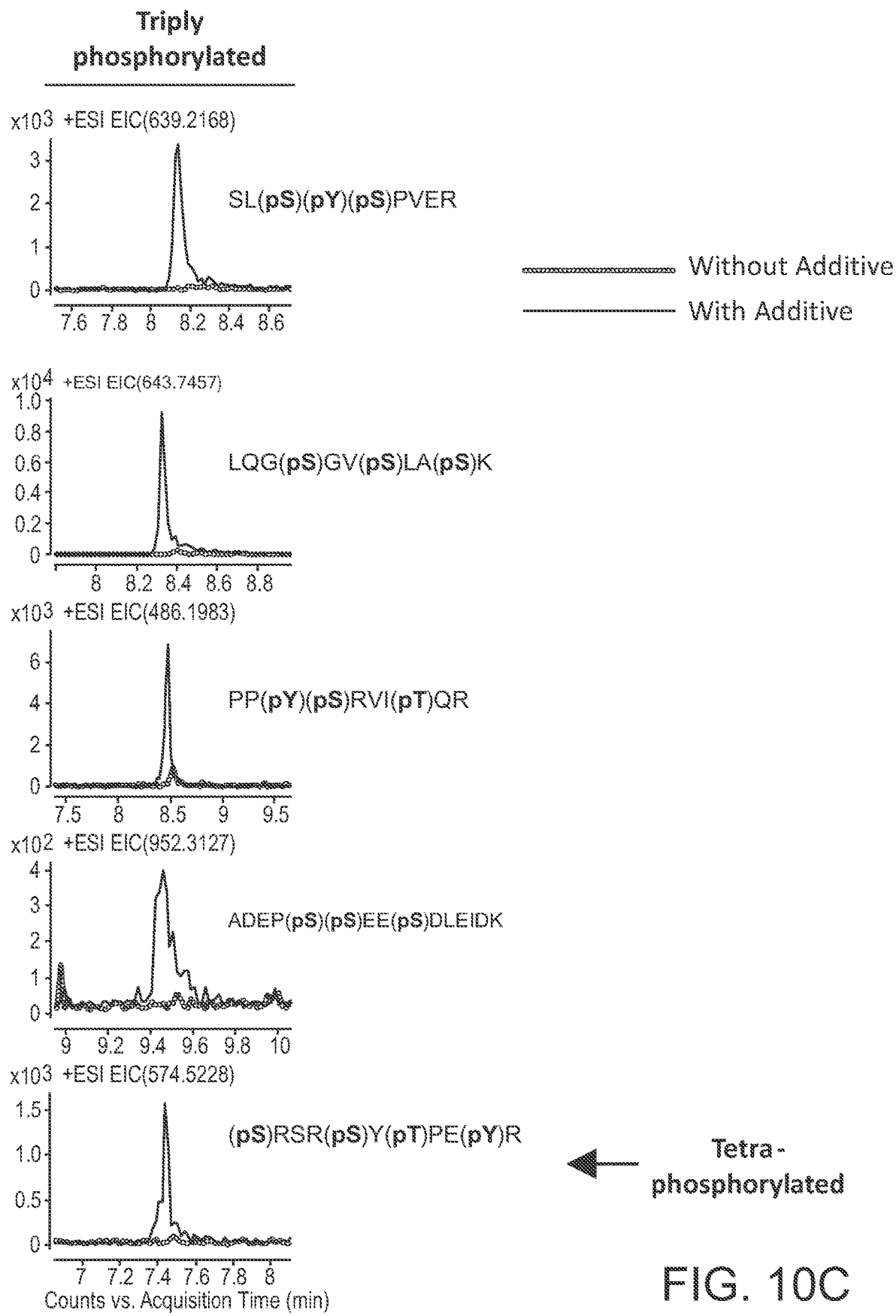
FIG. 10C shows the LC performance for a variety of triply or tetra phosphorylated phosphopeptides with and without the additive medronic acid.

Column Performance for Phosphopeptide Analysis with Medronic Acid 5 pmol (2.5 µl) of phosphopeptide mix (Sigma Aldrich, p/n MSP1L, MSP3L) was analyzed on the AdvBio Peptide Column (2.1×100 mm) using reverse phase liquid chromatography. Solvent A consists of MilliQ purified water with 0.1% formic acid. Solvent B consists of acetonitrile with 0.1% formic acid. The flow rate was 0.25 ml/min and a sample volume of 2.5 µl was injected onto the column for each experiment. After loading of the sample solution, the column was conditioned with 3% solvent B for 2 min before the gradient with solvent A was applied. The gradient elution profile was from 3 to 38% B for 10 min and then washed with 90% B for 3 min. The column is equilibrated with 3% B for 8 min prior to subsequent analysis. Full MS (MS1) data was acquired with a mass range of 400-1250 m/z and acquisition rate of 1 spectrum/s on the 6550 iFunnel Q-TOF system (Agilent Technologies, Inc.). The instrument was set at positive mode for the analysis. Runs were repeated 5 times. These results clearly demonstrated that addition of medronic acid to the mobile phase solvent promoted the detection of phosphopeptides that weren't detectable in the absence of the additive. Bold text for the peptide sequences indicates the phosphorylated residues. The results are shown in FIGS. 10A-10C. In FIG. 10A results are shown for VLHSG(pS)R, SEQ ID NO: 1; RDSLG(pT)YSSR, SEQ ID NO:2; EVQAEQPSS(pS)SPR, SEQ ID NO: 3; ADEP(pS)SEESDLEIDK, SEQ ID NO: 4; FEDEGAGFEES(pS)ETGDYEEK, SEQ ID NO: 5. In FIG. 10B results are shown for RS(pY)(pS)RSR, SEQ ID NO: 6; (pT)KLI(pT)QLRDAK, SEQ ID NO: 7; ADEPS(pS)EE(pS)DLEIDK, SEQ ID NO: 8; ELSN(pS)PLRENSFG(pS)PLEFR, SEQ ID NO: 9; SPTEYHEPV(pY)ANPFYRPT(pT)PQR, SEQ ID NO: 10. In FIG. 10C results are shown for SL(pS)(pY)(pS)PVER, SEQ ID NO: 11; LQG(pS)GV(pS)LA(pS)K, SEQ ID NO: 12; PP(pY)(pS)RVI(pT)QR, SEQ ID NO: 13; ADEP(pS)(pS)EE(pS)DLEIDK, SEQ ID NO: 14; and (pS)RSR(pS)Y(pT)PE(pY)R, SEQ ID NO: 15.

Figure 11:
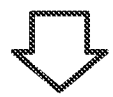
FIG. 11 shows a flow diagram of the method disclosed herein. Specifically, injecting a sample into a mobile phase comprising a solvent and an additive (e.g., medronic acid, pyrophosphoric acid) into the liquid chromatography column packed with a stationary phase; performing chromatography under conditions to separate the one or more analytes in the liquid chromatography column, by flowing the mobile phase with the sample through the liquid chromatography column; and analyzing the one or more separated analytes. Finally, analyzing the separated analytes by mass spectrometry.
Figure 11:
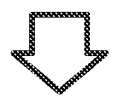
Figure 11:
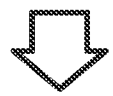

FIG. 11 shows a flow diagram of the method disclosed herein. In the method, a liquid chromatography column is packed with a stationary phase. A sample is injected into a mobile phase and introduced into the liquid chromatography column. The mobile phase comprises a solvent and an additive (e.g., medronic acid, pyrophosphoric acid). As the mobile phase flows over the stationary phase, the sample is separated in the liquid chromatography column into one or more analytes. When the analytes exit the column, they are analyzed by mass spectrometry.

SEQUENCE LISTING

Incorporation-by-Reference of Material Submitted Electronically

This application contains a sequence listing. It has been submitted electronically via EFS-Web as an ASCII text file entitled "20170060-01_SEQ_ST25.txt". The sequence listing is 5361 bytes in size, and was created on Aug. 21, 2017. It is hereby incorporated by reference in its entirety.

INCORPORATION BY REFERENCE

All references, articles, publications, patents, patent publications, and patent applications cited herein are incorporated by reference in their entireties for all purposes. However, mention of any reference, article, publication, patent, patent publication, and patent application cited herein is not, and should not be taken as an acknowledgment or any form of suggestion that they constitute valid prior art or form part of the common general knowledge in any country in the world. All publications, patents, and patent applications cited in this specification are herein incorporated by reference as if each individual publication or patent application were specifically and individually indicated to be incorporated by reference.

As used herein, the term "fluid" is used in a general sense to refer to any substance that is flowable through a conduit. Thus, the term "fluid" may generally refer to a liquid, a gas, or a supercritical fluid, unless specified otherwise or the context dictates otherwise.

As used herein, the term "liquid" generally encompasses a liquid having a single-compound composition, or a mixture of two or more different liquids such as, for example, two or more different solvents. A liquid may be a solution, a suspension, a colloid, or an emulsion. Solid particles and/or gas bubbles may be present in the liquid.

As used herein, the verb "comprise" as is used in this description and in the claims and its conjugations are used in its non-limiting sense to mean that items following the word are included, but items not specifically mentioned are not excluded.

Throughout the specification the word "comprising," or variations such as "comprises" or "comprising," will be understood to imply the inclusion of a stated element, integer or step, or group of elements, integers or steps, but not the exclusion of any other element, integer or step, or group of elements, integers or steps. The present disclosure may suitably "comprise", "consist of", or "consist essentially of", the steps, elements, and/or reagents described in the claims.

It is further noted that the claims may be drafted to exclude any optional element. As such, this statement is intended to serve as antecedent basis for use of such exclusive terminology as "solely", "only" and the like in connection with the recitation of claim elements, or the use of a "negative" limitation.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. A method for analyzing one or more analytes in a sample by liquid chromatography coupled with mass spectrometry, the method comprising:
   providing a liquid chromatography column packed with a stationary phase;
   providing a mobile phase comprising one or more solvents and an additive of medronic acid;
   injecting the sample into the mobile phase;
   performing chromatography under conditions to separate the one or more analytes in the liquid chromatography column, by flowing the mobile phase with the sample through the liquid chromatography column; and
   analyzing the one or more separated analytes with a mass spectrometer.

2. The method of claim 1, wherein the medronic acid additive is present while all of the one or more analytes are separated.

3. The method of claim 1, wherein the liquid chromatography column is a hydrophilic interaction liquid chromatography (HILIC) column.

4. The method of claim 1, wherein the liquid chromatography column is a reverse phase liquid chromatography (RPLC) column.

5. The method of claim 4, wherein the reverse phase liquid chromatography (RPLC) column is operated in an ion pairing mode.

6. The method of claim 1, wherein the liquid chromatography column is a size exclusion column.

7. The method of claim 1, wherein the mass spectrometer is run in both a positive and a negative mode analysis.

8. The method of claim 1, wherein the medronic acid is present in a concentration of about 1.0 µM to about 10.0 µM.

9. The method of claim 8, wherein the medronic acid is present in a concentration of about 2.5 µM to about 7.5 µM.

10. The method of claim 8, wherein the mobile phase contains two or more solvents which create a concentration gradient during the chromatography and the concentration of medronic acid is kept constant during the chromatography.

11. The method of claim 8, wherein the mobile phase contains two or more solvents which create a concentration gradient during the chromatography and the concentration of medronic acid varies during the chromatography.

12. The method of claim 1, wherein the analytes are anionic compounds.

13. The method of claim 12, wherein the anionic compounds are phosphorylated compounds, sulfated compounds, or carboxylated compounds.

14. The method of claim 13, wherein the phosphorylated compounds are phosphopeptides.

15. The method of claim 13, wherein the anionic compounds are pesticides, pharmaceuticals or their metabolites.

16. The method of claim 1, wherein the mobile phase comprises a polar solvent and a non-polar solvent.

17. The method of claim 16, wherein the mobile phase comprises water and an organic compound.

18. The method of claim 1, wherein the mobile phase comprises at least two solvents, and flowing the mobile phase with the sample through the liquid chromatography column is done according to an isocratic elution mode.

19. The method of claim 1, wherein the mobile phase comprises at least two solvents, and flowing the mobile phase with the sample through the liquid chromatography column is done according to a gradient elution mode.

20. The method of claim 1, wherein the providing the mobile phase comprises a step selected from the group consisting of:
   preinjecting the medronic acid onto the column;
   coinjecting the medronic acid with the sample;
   adding the medronic acid to one or all of the one or more solvents;
   adding the medronic acid to one or more solvent reservoirs containing the one or more solvents;
   adding the medronic acid to one or more solvent supply lines by which the one or more solvents are supplied;
   adding the medronic acid to a mixer in which the one or more solvents are mixed; and
   adding the medronic acid to a proportioning valve in which the one or more solvents are mixed.

* * * * *

```
                            SEQUENCE LISTING

<160> NUMBER OF SEQ ID NOS: 15

<210> SEQ ID NO 1
<211> LENGTH: 7
<212> TYPE: PRT
<213> ORGANISM: artificial
<220> FEATURE:
<223> OTHER INFORMATION: synthetic sequence
<220> FEATURE:
<221> NAME/KEY: MOD_RES
<222> LOCATION: (6)..(6)
<223> OTHER INFORMATION: PHOSPHORYLATION

<400> SEQUENCE: 1

Val Leu His Ser Gly Ser Arg
1               5

<210> SEQ ID NO 2
<211> LENGTH: 10
<212> TYPE: PRT
<213> ORGANISM: artificial
<220> FEATURE:
<223> OTHER INFORMATION: synthetic sequence
<220> FEATURE:
<221> NAME/KEY: MOD_RES
<222> LOCATION: (6)..(6)
<223> OTHER INFORMATION: PHOSPHORYLATION

<400> SEQUENCE: 2

Arg Asp Ser Leu Gly Thr Tyr Ser Ser Arg
1               5                   10

<210> SEQ ID NO 3
<211> LENGTH: 13
<212> TYPE: PRT
<213> ORGANISM: artificial
<220> FEATURE:
<223> OTHER INFORMATION: synthetic sequence
<220> FEATURE:
<221> NAME/KEY: MOD_RES
<222> LOCATION: (10)..(10)
<223> OTHER INFORMATION: PHOSPHORYLATION

<400> SEQUENCE: 3

Glu Val Gln Ala Glu Gln Pro Ser Ser Ser Ser Pro Arg
1               5                   10

<210> SEQ ID NO 4
<211> LENGTH: 15
<212> TYPE: PRT
<213> ORGANISM: artificial
<220> FEATURE:
<223> OTHER INFORMATION: synthetic sequence
<220> FEATURE:
<221> NAME/KEY: MOD_RES
<222> LOCATION: (5)..(5)
<223> OTHER INFORMATION: PHOSPHORYLATION

<400> SEQUENCE: 4

Ala Asp Glu Pro Ser Ser Glu Glu Ser Asp Leu Glu Ile Asp Lys
1               5                   10                  15

<210> SEQ ID NO 5
```

```
<211> LENGTH: 20
<212> TYPE: PRT
<213> ORGANISM: artificial
<220> FEATURE:
<223> OTHER INFORMATION: synthetic sequence
<220> FEATURE:
<221> NAME/KEY: MOD_RES
<222> LOCATION: (12)..(12)
<223> OTHER INFORMATION: PHOSPHORYLATION

<400> SEQUENCE: 5

Phe Glu Asp Glu Gly Ala Gly Phe Glu Glu Ser Ser Glu Thr Gly Asp
1               5                   10                  15

Tyr Glu Glu Lys
            20

<210> SEQ ID NO 6
<211> LENGTH: 7
<212> TYPE: PRT
<213> ORGANISM: artificial
<220> FEATURE:
<223> OTHER INFORMATION: synthetic sequence
<220> FEATURE:
<221> NAME/KEY: MOD_RES
<222> LOCATION: (3)..(4)
<223> OTHER INFORMATION: PHOSPHORYLATION

<400> SEQUENCE: 6

Arg Ser Tyr Ser Arg Ser Arg
1               5

<210> SEQ ID NO 7
<211> LENGTH: 11
<212> TYPE: PRT
<213> ORGANISM: artificial
<220> FEATURE:
<223> OTHER INFORMATION: synthetic sequence
<220> FEATURE:
<221> NAME/KEY: MOD_RES
<222> LOCATION: (1)..(1)
<223> OTHER INFORMATION: PHOSPHORYLATION
<220> FEATURE:
<221> NAME/KEY: MOD_RES
<222> LOCATION: (5)..(5)
<223> OTHER INFORMATION: PHOSPHORYLATION

<400> SEQUENCE: 7

Thr Lys Leu Ile Thr Gln Leu Arg Asp Ala Lys
1               5                   10

<210> SEQ ID NO 8
<211> LENGTH: 15
<212> TYPE: PRT
<213> ORGANISM: artificial
<220> FEATURE:
<223> OTHER INFORMATION: synthetic sequence
<220> FEATURE:
<221> NAME/KEY: MOD_RES
<222> LOCATION: (6)..(6)
<223> OTHER INFORMATION: PHOSPHORYLATION
<220> FEATURE:
<221> NAME/KEY: MOD_RES
<222> LOCATION: (9)..(9)
<223> OTHER INFORMATION: PHOSPHORYLATION

<400> SEQUENCE: 8

Ala Asp Glu Pro Ser Ser Glu Glu Ser Asp Leu Glu Ile Asp Lys
1               5                   10                  15

<210> SEQ ID NO 9
```

```
<211> LENGTH: 19
<212> TYPE: PRT
<213> ORGANISM: artificial
<220> FEATURE:
<223> OTHER INFORMATION: synthetic sequence
<220> FEATURE:
<221> NAME/KEY: MOD_RES
<222> LOCATION: (5)..(5)
<223> OTHER INFORMATION: PHOSPHORYLATION
<220> FEATURE:
<221> NAME/KEY: MOD_RES
<222> LOCATION: (14)..(14)
<223> OTHER INFORMATION: PHOSPHORYLATION

<400> SEQUENCE: 9

Glu Leu Ser Asn Ser Pro Leu Arg Glu Asn Ser Phe Gly Ser Pro Leu
1               5                   10                  15

Glu Phe Arg

<210> SEQ ID NO 10
<211> LENGTH: 22
<212> TYPE: PRT
<213> ORGANISM: artificial
<220> FEATURE:
<223> OTHER INFORMATION: synthetic sequence
<220> FEATURE:
<221> NAME/KEY: MOD_RES
<222> LOCATION: (10)..(10)
<223> OTHER INFORMATION: PHOSPHORYLATION
<220> FEATURE:
<221> NAME/KEY: MOD_RES
<222> LOCATION: (19)..(19)
<223> OTHER INFORMATION: PHOSPHORYLATION

<400> SEQUENCE: 10

Ser Pro Thr Glu Tyr His Glu Pro Val Tyr Ala Asn Pro Phe Tyr Arg
1               5                   10                  15

Pro Thr Thr Pro Gln Arg
            20

<210> SEQ ID NO 11
<211> LENGTH: 9
<212> TYPE: PRT
<213> ORGANISM: artificial
<220> FEATURE:
<223> OTHER INFORMATION: synthetic sequence
<220> FEATURE:
<221> NAME/KEY: MOD_RES
<222> LOCATION: (3)..(5)
<223> OTHER INFORMATION: PHOSPHORYLATION

<400> SEQUENCE: 11

Ser Leu Ser Tyr Ser Pro Val Glu Arg
1               5

<210> SEQ ID NO 12
<211> LENGTH: 11
<212> TYPE: PRT
<213> ORGANISM: artificial
<220> FEATURE:
<223> OTHER INFORMATION: synthetic sequence
<220> FEATURE:
<221> NAME/KEY: MOD_RES
<222> LOCATION: (4)..(4)
<223> OTHER INFORMATION: PHOSPHORYLATION
<220> FEATURE:
<221> NAME/KEY: MOD_RES
<222> LOCATION: (7)..(7)
<223> OTHER INFORMATION: PHOSPHORYLATION
<220> FEATURE:
<221> NAME/KEY: MOD_RES
```

```
<222> LOCATION: (10)..(10)
<223> OTHER INFORMATION: PHOSPHORYLATION

<400> SEQUENCE: 12

Leu Gln Gly Ser Gly Val Ser Leu Ala Ser Lys
1               5                   10

<210> SEQ ID NO 13
<211> LENGTH: 10
<212> TYPE: PRT
<213> ORGANISM: artificial
<220> FEATURE:
<223> OTHER INFORMATION: synthetic sequence
<220> FEATURE:
<221> NAME/KEY: MOD_RES
<222> LOCATION: (3)..(3)
<223> OTHER INFORMATION: PHOSPHORYLATION
<220> FEATURE:
<221> NAME/KEY: MOD_RES
<222> LOCATION: (4)..(4)
<223> OTHER INFORMATION: PHOSPHORYLATION
<220> FEATURE:
<221> NAME/KEY: MOD_RES
<222> LOCATION: (8)..(8)
<223> OTHER INFORMATION: PHOSPHORYLATION

<400> SEQUENCE: 13

Pro Pro Tyr Ser Arg Val Ile Thr Gln Arg
1               5                   10

<210> SEQ ID NO 14
<211> LENGTH: 15
<212> TYPE: PRT
<213> ORGANISM: artificial
<220> FEATURE:
<223> OTHER INFORMATION: synthetic sequence
<220> FEATURE:
<221> NAME/KEY: MOD_RES
<222> LOCATION: (5)..(5)
<223> OTHER INFORMATION: PHOSPHORYLATION
<220> FEATURE:
<221> NAME/KEY: MOD_RES
<222> LOCATION: (6)..(6)
<223> OTHER INFORMATION: PHOSPHORYLATION
<220> FEATURE:
<221> NAME/KEY: MOD_RES
<222> LOCATION: (9)..(9)
<223> OTHER INFORMATION: PHOSPHORYLATION

<400> SEQUENCE: 14

Ala Asp Glu Pro Ser Ser Glu Glu Ser Asp Leu Glu Ile Asp Lys
1               5                   10                  15

<210> SEQ ID NO 15
<211> LENGTH: 11
<212> TYPE: PRT
<213> ORGANISM: artificial
<220> FEATURE:
<223> OTHER INFORMATION: synthetic sequence
<220> FEATURE:
<221> NAME/KEY: MOD_RES
<222> LOCATION: (1)..(1)
<223> OTHER INFORMATION: PHOSPHORYLATION
<220> FEATURE:
<221> NAME/KEY: MOD_RES
<222> LOCATION: (5)..(5)
<223> OTHER INFORMATION: PHOSPHORYLATION
<220> FEATURE:
<221> NAME/KEY: MOD_RES
<222> LOCATION: (7)..(7)
<223> OTHER INFORMATION: PHOSPHORYLATION
<220> FEATURE:
<221> NAME/KEY: MOD_RES
```

```
<222> LOCATION: (10)..(10)
<223> OTHER INFORMATION: PHOSPHORYLATION

<400> SEQUENCE: 15

Ser Arg Ser Arg Ser Tyr Thr Pro Glu Tyr Arg
1               5                   10
```